(12) United States Patent
Imaizumi et al.

(10) Patent No.: US 6,678,313 B1
(45) Date of Patent: Jan. 13, 2004

(54) CORRELATION CIRCUIT FOR SPREAD SPECTRUM COMMUNICATION

(75) Inventors: Ichiro Imaizumi, Tokyo (JP); Kouya Hoshina, Tokyo (JP); Kenjiro Yasunari, Tokyo (JP)

(73) Assignee: Kokusai Electric Co., Ltd., Tokyo (JP)

( * ) Notice: Subject to any disclaimer, the term of this patent is extended or adjusted under 35 U.S.C. 154(b) by 0 days.

(21) Appl. No.: 09/472,003

(22) Filed: Dec. 27, 1999

(30) Foreign Application Priority Data

Dec. 25, 1998 (JP) .......................................... 10-371463
Jan. 13, 1999 (JP) .......................................... 11-006217

(51) Int. Cl.[7] .............................................. H04B 1/69
(52) U.S. Cl. ................................................... 375/150
(58) Field of Search ................................ 375/130, 142, 375/143, 144, 150, 148, 152; 370/320, 335, 342, 441

(56) References Cited

U.S. PATENT DOCUMENTS

| | | | | |
|---|---|---|---|---|
| 5,768,306 A | * | 6/1998 | Sawahashi et al. | 375/150 |
| 5,818,866 A | * | 10/1998 | Wilk | 375/149 |
| 5,982,763 A | * | 11/1999 | Sato | 370/342 |
| 6,038,250 A | * | 3/2000 | Shou et al. | 375/143 |
| 6,151,353 A | * | 11/2000 | Harrison et al. | 375/136 |
| 6,175,561 B1 | * | 1/2001 | Storm et al. | 370/342 |
| 6,370,130 B1 | * | 4/2002 | Zhou et al. | 370/335 |
| 6,445,714 B1 | * | 9/2002 | d'Anjou et al. | 370/441 |
| 6,456,827 B1 | * | 9/2002 | Kubo et al. | 455/68 |
| 6,496,533 B2 | * | 12/2002 | Lennen | 375/147 |

FOREIGN PATENT DOCUMENTS

| | | |
|---|---|---|
| JP | 8-509343 | 10/1996 |
| JP | 10-145333 | 5/1998 |

* cited by examiner

*Primary Examiner*—Emmanuel Bayard
(74) *Attorney, Agent, or Firm*—Jacobson Holman PLLC

(57) ABSTRACT

There is disclosed a correlation circuit for spread spectrum communication which reduces the number of constituting elements to attain low power consumption and which can obtain correlation in a short time, to solve a problem that a conventional sliding correlator requires much time to obtain the correlation and that a matched filter increases the power consumption. In the spread spectrum communication correlation circuit, an A/D converter converts a received spread spectrum signal to a digital signal. Under control of a controller, one symbol of signals are written to an S/H circuit with a 16 MHz. clock, shifted for each sample and read to a high-speed correlator from the S/H circuit with a high-speed clock of 1.6 GHz a plurality of times, and the high-speed correlator performs a product sum operation with a spread code with the 1.6 GHz clock. At the same time the reading is performed, the next symbol of signals are written to the S/H circuit.

23 Claims, 15 Drawing Sheets

CORRELATION CIRCUIT FOR SPREAD SPECTRUM COMMUNICATION

BACKGROUND OF THE INVENTION

1. Field of the Invention

The present invention relates to a correlator for spread spectrum communication for use on the side of a receiver of a spread spectrum communication system in mobile communication, radio LAN, and the like.

2. Description of the Related Art

Generally in a spread spectrum (SS) communication system for use in mobile communication or radio LAN, two-stage modulations, that is, narrow band modulation (primary modulation) and further spread modulation (secondary modulation) are performed on transmission data and the data is transmitted on the transmission side, while on the reception side, inverse spreading is performed on the received data, thereby returning to the primary modulation, and base band signals are reproduced in a usual wave detector circuit.

Furthermore, a conventional correlator for spread spectrum communication to obtain correlation for modulating received signals with spread spectra is constituted of an inverse spread circuit, and a modulation circuit for code division multiple access modulation waves. Specifically, a sliding correlator (SC) constituted of a logical circuit is used in the spread spectrum communication correlator in order to perform synchronous capturing and subsequently take correlation with a detected synchronous phase.

The sliding correlator uses one correlator of one to shift station issued code series (spread codes) by each bit, and obtains the correlation with each received code series. When the correlation is obtained with respect to the number of chips corresponding to the length of one symbol, the synchronous phase in which the correlation reaches its peak is obtained, and the synchronous capturing is performed.

Here the sliding correlator as one conventional inverse spread circuit will be described with reference to FIG. 14. FIG. 14 is a block diagram of one part of the conventional sliding correlator.

In the conventional sliding correlator a section for obtaining a correlation output is constituted of an A/D converter 31, a multiplier 32, a PN code register 33, an adder 34, and a delay circuit 35.

Each component of the conventional sliding correlator will be described.

The A/D converter 31 is a high precision analog/digital converter which converts an analog signal subjected to code division multiple access (CDMA) modulation, transmitted, and received by an antenna (not shown) into a digital signal.

The PN code register 33 is a register for outputting a pseudo random noise (PN) code which is the same spread code as the code used in the CDMA modulation on the transmission side.

The multiplier 32 is a multiplier which multiplies the digital reception data outputted from the A/D converter 31 by the PN code outputted from the PN code register 33.

The adder 34 and the delay circuit 35 accumulate/add multiplication results outputted from the multiplier 32 for one symbol period and output the integration value as the correlation output.

The operation of the conventional sliding correlator comprises converting the analog signal of the reception data received by the antenna into the digital signal by the A/D converter 31, multiplying the digital signal by the PN code outputted from the PN code register 33by the multiplier 32, performing accumulation/addition by the adder 34 and the delay circuit 35, and outputting the addition result for one symbol as the correlation output.

Subsequently, the accumulation/addition is repeated by shifting the multiplication timing in the multiplier 32 by one chip(more precisely, an interval of sample in the A/D converter) to change the phase, and the synchronous phase in which the correlation output reaches its peak is detected.

This constitution using the sliding correlator as the inverse spread circuit is relatively simple, has a small number of gates, and has little power consumption. However, since the time for the time of one symbol×the number of chips in one symbol is necessary until the synchronous capturing is performed, there is a problem that much time is necessary until the correlation output is obtained.

To solve the problem that much time is required until the correlation output is obtained, the use of a matched filter (MF) in the spread spectrum communication correlator instead of the sliding correlator is proposed.

The matched filter performs the synchronous capturing within one symbol time by collectively taking the correlation when the phase is shifted.

Here the matched filter as another example of the conventional inverse spread circuit will be described with reference to FIG. 15. FIG. 15 is a block diagram showing the constitution example of the conventional matched filter.

The conventional matched filter is constituted of an A/D converter 41, a multiplier 42, a PN code register 43, an adder 44, and a sample hold (S/H) circuit 45.

Each component of the conventional matched filter will be described.

The A/D converter 41 is a converter which converts an analog input signal subjected to the CDMA modulation, transmitted to a digital signal.

The sample hold (S/H) circuit 45 comprises a plurality of circuits for successively taking and holding the digital signals from the A/D converter 41.

The PN code register 43 is a register for outputting the PN code which is a spread code.

The multiplier.42 is a multiplier which multiplies the digital signal held by each sample hold circuit 45 by the PN code from the PN code register 43.

The adder 44 is an adder for collectively adding the outputs from the multiplier 42.

The operation of the conventional matched filter comprises successively holding the input signals subjected to digital conversion in the A/D converter 41 by a plurality of S/H circuits 45, multiplying the output from the S/H circuit 45 by the PN code outputted from the PN code register 43 by the multiplier 42, further collectively adding the multiplication result of the multiplier 42 by the adder 44, and outputting the addition result. The correlation output is obtained from the addition result.

In the general matched filter, however, in order to take the correlation when the phase is collectively shifted, different from the above-described sliding correlator, for example, the number of gates multiplied by the number of chips in one symbol is necessary, and the gate scale is enlarged, thereby causing the increase of LSI price and power consumption, so that it is actually difficult to use the matched filter in a mobile terminal receiver.

As described above, the conventional sliding correlator has a problem that much time is required until the correlation output is obtained, and the conventional matched filter has a problem that the number of gates is increased, thereby resulting in the increase of LSI price and power consumption.

SUMMARY OF THE INVENTION

An object of the present invention is to provide a correlation circuit for spread spectrum communication, which reduces the number of constituting elements to achieve a low LSI price and can obtain correlation outputs.

According to the present invention, in the spread spectrum communication correlation circuit, a processing is repeated a plurality of times, comprising writing a spectrum spread reception signal into a memory, reading the written spread spectrum signal from the memory at a speed higher than the writing speed and performing product sum operation with a spread code at a high speed, the number of constituting elements is reduced, and the correlation output can be obtained in a short time as compared with the matched filter.

Moreover, according to the present invention, there is provided a correlation circuit for spread spectrum communication, comprising one or more receiving sections for receiving spread spectrum signals, one or more memory sections for holding the received spread spectrum signals, one or more multipliers for multiplying the signal held in the memory section and a spread code, and one or more adding sections for adding multiplication results. The spread spectrum signal inputted from one or more receiving sections is time-divided in a sampling time or a time shorter than the sampling time, at least one symbol of time-divided signals are held in the memory section, the held signals are read in a time which is further shorter than the time shorter than the chip time, the signal is multiplied by the spread code in the multiplying section, and the multiplication results are added by the adding section to obtain the correlation, so that the number of constituting elements is reduced and the correlation output can be obtained in a short time as compared with the matched filter.

Moreover, according to the present invention, there is provided an interference canceler provided with a plurality of interference canceler units having matched filters for an in-phase component (I) and an orthogonal component (Q) of an orthogonal wave detecting signal of a received spread spectrum signal, comprising a memory disposed in the previous stage of the matched filter which can perform writing and reading at the same time and can perform the reading at a speed higher than a writing speed. The matched filter performs a high-speed operation processing of the signal read from the memory at a high speed. The number of constituting elements is reduced and interference canceling can be performed in a short time.

Furthermore, according to the present invention, since the correlation circuit for spread spectrum. communication repeats a processing a plurality of times comprising writing a spectrum spread reception signal into a memory, storing the written signal to a logical section. for reading the signal from the memory via multiple taps in accordance with a time conversion amount to perform time conversion, performing parallel/serial conversion in the logical section at a speed higher than the writing speed of the memory to perform the time conversion, and performing a high-speed product sum operation with a spread code, the number of constituting elements is reduced, and the correlation output can be obtained.

Additionally, according to the present invention, there is provided a correlator for spread spectrum communication, comprising one or more receiving sections for receiving spread spectrum signals, one or more memory sections for holding the received spread spectrum signals, one or more logical sections for performing time conversion to perform a high-speed operation processing of the signal read from the memory, one or more multiplying sections for multiplying the signal held in the memory section and a. spread code, and one or more adding sections for adding multiplication results. The spread spectrum signal inputted from one or more receiving sections is time-divided in a sampling time or a time shorter than the sampling time, about one symbol of time-divided signals are held in the memory section, the signals held in the memory section are read via multiple taps in accordance with a time conversion amount in the logical section to perform a high-speed parallel/serial conversion and time conversion, the signal is multiplied by the spread code in the multiplying section, and the multiplication results are added by the adding section to obtain the correlation, so that the number of constituting elements is reduced and the correlation output can be obtained.

Moreover, according to the present invention, there is provided a correlation circuit for spread spectrum communication, comprising two sets of the correlators for spread spectrum communication, in which the receiving section in the correlators is used in common, an in-phase component (I) and an orthogonal component (Q) of an orthogonal wave detecting signal of a spread spectrum signal wave-detected by the receiving section are multiplied by different spread codes, and multiplication results are added.

Furthermore, according to the present invention, there is a correlation circuit for spread spectrum communication, comprising four sets of the correlators for spread spectrum communication, in which two sets are regarded as a pair, the receiving section in the pair of correlators is used in common, an in-phase component (I) and an orthogonal component (Q) of an orthogonal wave. detecting signal of a spread spectrum signal wave-detected by the receiving section are multiplied by different first and second spread codes in each pair, and for four correlation outputs obtained by adding multiplication results, the results of operation with the first spread code and the results of operation with the second spread code are added and synthesized.

Figure 1:
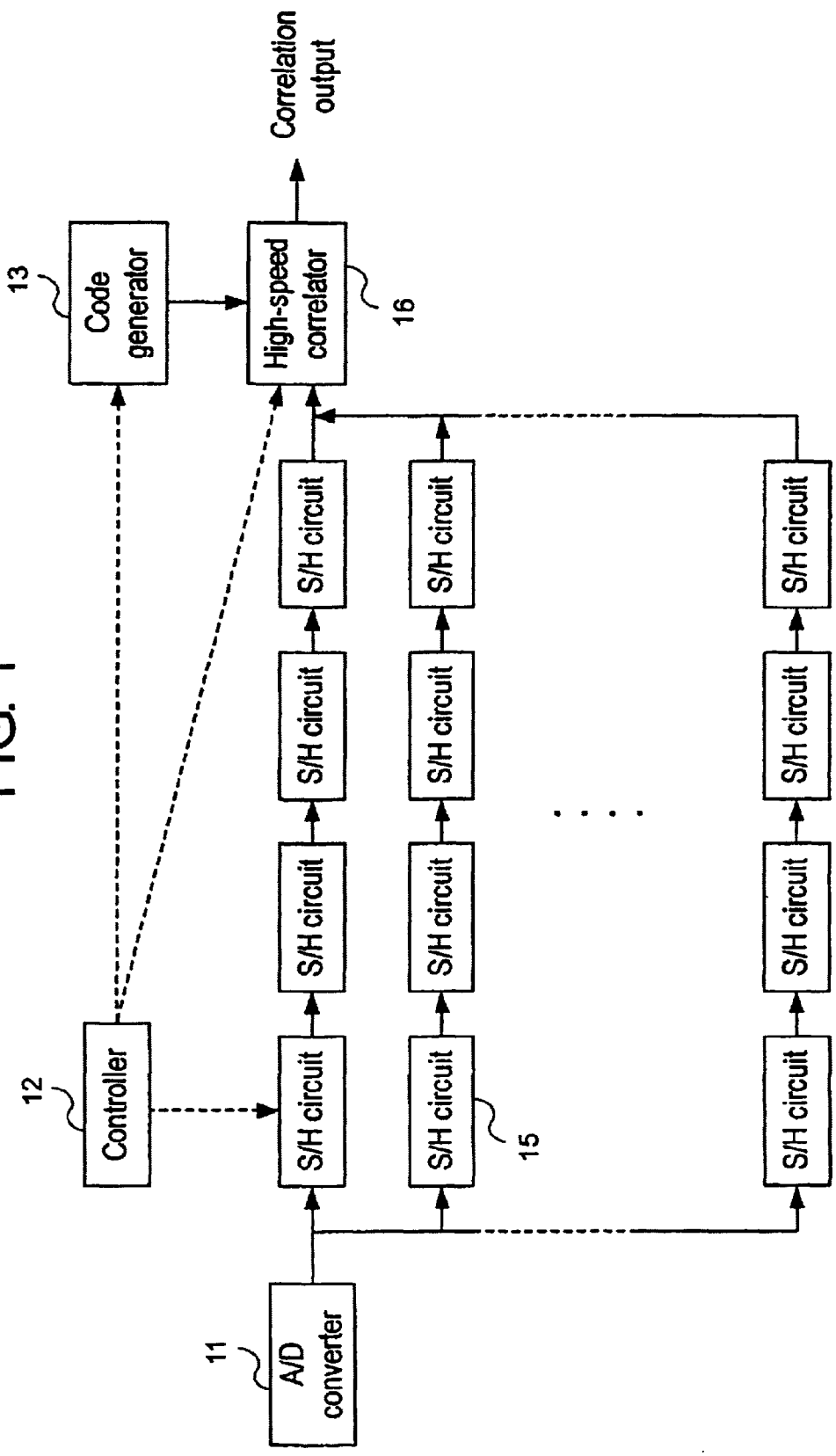
FIG. 1 is a block diagram of a spread spectrum communication correlation circuit according to an embodiment of the present invention.

DESCRIPTION OF REFERENCE NUMERALS 11, 21, 31, 41 ... A/D converter, 12, 22 ... controller, 13, 23 ... code generator, 14 ... memory section, 15, 25 ... sample hold (S/H) circuit, 15 ... multi-tap F/F, 16, 26 ... high-speed correlator, 20 ... two-port memory, 24, 27 ... address decoder, 28 ... sense amplifier, 32, 42 ... multiplier, 33, 43 ... PN code register, 34, 44 ... adder, 35 ... delay circuit, 45 sample hold (S/H) circuit, 51 ... antenna, 52 ... RF section, 53 ... AD converter, 54 ... memory section, 55 ... first high-speed correlator, 56 ... spread code generator, 57 ... profiler, 58 ... second high-speed correlator, 59 ... RAKE synthesizer, 60 ... data and voice processor, 61 ... controller, 62 .... finger memory, 63 ... multi-tap F/F

DESCRIPTION OF THE PREFERRED EMBODIMENTS

Embodiments of the present invention will be described with reference to the drawings.

A spread spectrum communication correlation circuit according to the embodiment of the present invention repeats a processing a plurality of times, comprising temporarily storing in a memory a spread spectrum signal transmitted from a receiver, which is obtained by processing the signal with a spread code usually at a so-called chip time interval and spectrum-spreading the signal, reading the stored spread spectrum signal at a high speed, and performing product sum operation of the read signal and the spread code at a high speed, so that the number of constituting elements is reduced and a correlation output can be obtained.

Specifically, at least one symbol of the spread spectrum signals are stored in the memory, read at a high speed, and subjected to the product sum operation with the spread code at a high speed, so that the time conversion of the spread spectrum signal inputted from the receiver is realized.

At present so-called wide band CDMA (W-CDMA) proposed by Association of Radio Industries and Businesses (ARIB) in IMT 2000 has a chip rate of 4 mega (M) cps (chip per second). On the other hand, when the manufacture process of a large-scaled integrated circuit (LSI) of 2001 when W-CDMA is placed in practical use, in a complementary MOS (CMOS), a line width is about 0.18 μm, and the clock frequency-to be used is expected to be in the range of 500 MHz to 2 giga (G) Hz.

Specifically, a processing with a frequency far higher than a frequency of input signal is possible in the circuit. Since the chip rate is 4 Mcps, the signal is cut by about fourfold sampling in the signal processing, and the matching with the spread code needs to be observed more precisely. Even in this case, the clock used for processing the reception signal is processed at 16 MHz. On the other hand, when 1.6 GHz can be used as the rate of the clock used for the internal processing of the circuit, the internal processing ability becomes 100 times as much as the reception signal processing ability.

In order to achieve the same function as that of the matched filter, for example, when the spread spectrum signal received at every 16 MHz as usual is stored in the memory, and read, for example, at a high speed of 1.6 GHz, and the product sum operation is performed in the high-speed processing sliding correlator at a high speed, the processing can be:performed at 100-fold speed. Therefore, when the number of chips (spread ratio) is 25, 100 samples are present with fourfold over-sampling, and the correlation of one symbol can be obtained in one symbol time in the same manner as in the matched filter.

In this case, the spread code is repeatedly used 100 times without being changed for one symbol, but the spread spectrum signal needs to be slid for every sample, and at least two symbols of memory need to be prepared.

First, after one symbol of data is written in a first memory at 1.6 MHz, the next one symbol is written to a second memory for every sample, and additionally one symbol of data is slid for every sample at 1.6 GHz to perform reading 100 times.

Specifically, when one symbol of data is slid for every sample and the reading is performed 100 times at 1.6 GHz from the first memory in which one symbol of data is written and the second memory to which writing is performed for every sample, writing and reading are simultaneously performed on the second memory. Just at the time when one symbol of data is read, the next symbol of spread spectrum signals are read into the second memory.

When this operation is alternately performed with the first and second memories, the writing and reading of the spread spectrum signals to the memory can continuously be performed. Therefore, the correlation output can constantly be transmitted in the same manner as in the matched filter.

In the WTCDMA, the spread ratio differs with physical channels, but four chips at minimum, and 256 chips at maximum are necessary. However, in this case, the chip rate may be considered to be constant at 4.096 Mcps. Additionally, in future, the chip rate has a possibility of rising to 16.384 Mcps in which a variable rate is assumed.

Therefore, when 256 chips are necessary at maximum, the processing cannot actually be performed with one high-speed processing sliding correlator (high-speed SC). In this case, a plurality of high-speed SCs may be prepared to perform the similar operation by shifting for every sample.

Specifically for 256 chips, 1024 samples (256 chips×4 over-sampling) are present. Therefore, when the clock of 1.6 GHz can be used as the clock for reading the data from the memory, 100-fold processing is performed with the clock of 1.6 GHz, and eleven high-speed SCs are necessary. With the eleven high-speed SCs 1100 samples (100 samples×11) can be handled. Even in this case, the processing can be realized with a much smaller hardware scale as compared with the hardware scale constituting the matched filter (MF) with 1024 taps.

In the circuit according to the embodiment of the present invention, the hardware scale becomes about $\frac{1}{10}$. Therefore, when MF section occupying a large part of a demodulating section of W-CDMA is about $\frac{1}{10}$, LSI cost can effectively be reduced.

Additionally, a case in which no spread code is changed has been described in the above example. However, when the signal is fixed and the spread code is changed, the spread code is specified in a short time so that the correlation output can be obtained.

Moreover, when a product sum operator of MF constitution is prepared instead of the high-speed SC, and the reading from the memory is performed with multiple taps having symbol units, the correlation output can be outputted in an extremely short time, for example, in one nanosecond (ns) for the clock of 1 GHz.

This is effective when a large number of memories are prepared, a large number of symbol units of information are stored in the memories, and correlation outputs are obtained. Specifically, even when a plurality of MFs are originally necessary, the processing can be performed by one MF.

Additionally, MF operation is necessary as a mobile terminal in the W-CDMA system in an initial synchronization when the long mask symbol of a first perch tries to be captured, that is, only when symbol synchronization and slot synchronization are established. In the other cases, intermittent operation is permitted.

In the initial synchronization, after the long mask symbol of the first perch is captured, a long code group is specified with the long mask symbol of a second perch. This can be achieved by demodulating the input signal of the same time with another short code. Furthermore, a long code is specified in the place of pilot symbol of the first perch. Thereby, the initial synchronization can substantially be achieved.

The time for completing these operations is three seconds or less when these operations are performed on a plurality of base stations. Considering that the time for capturing the initial long mask symbol is extremely short (at least one second or less) and that even when the power consumption is increased, the operation is performed only when the switch is turned on in the entire talking time, it can be said that substantially no influence is exerted on a battery. Specifically, the SC operation may usually be performed intermittently, and the reduction of power consumption can generally be achieved.

The spread spectrum communication correlation circuit according to the embodiment of the present invention will next be described with reference to FIG. 1. FIG. 1 is a block diagram of the spread spectrum communication correlation circuit according to the embodiment of the present invention. Additionally, here, the relative simple operation, that is, the operation after symbol synchronization, radio slot synchronization, and frame synchronization are established (during normal communication) will first be described.

The spread spectrum communication correlation circuit (the present circuit) of the embodiment is, as shown in FIG. 1, constituted of a code generator 13 for generating a PN code of time series, an A/D converter 11 for inputting a spread spectrum signal modulated by the PN code and converting the analog signal to a digital signal, a plurality of sample hold (S/H) circuits 15 as a memory section for holding the digital signal, a high-speed correlator 16 for performing a product sum operation processing of the outputs from the plurality of S/H circuits 15 and the PN code outputted from the code generator 13, and a controller 12 for controlling input/output of data to the S/H circuits 15, the code generator 13 and the high-speed correlator 16.

The operation of the present circuit during normal communication will be described.

The sample hold (S/H) circuit 15 plays a role of the memory section for temporarily holding the inputted digital signal, and comprises a plurality of S/H strings obtained by connecting a plurality of S/H circuits 15 in series so that one symbol of data can be held. Subsequently, one symbol of signal data are successively shifted from a top sample and taken into each S/H circuit 15 according to the instruction of the controller 12.

Here, since it is assumed that the symbol synchronization, radio slot synchronization, and frame synchronization are established, the phase in which the top sample of the specific symbol is present is known.

One symbol of signals are taken into the S/H string. For example, in the spread ratio of 128, and with fourfold over-sampling, the signals are taken into the series connection of 512 S/H circuits in total.

Then, the controller 12 allows the S/H circuit 15 to perform reading at a sufficiently faster speed, for example, of 1.6 GHz than the present taking speed, that is, sample speed (about 16 MHz for usual fourfold over-sampling, precisely 4 times 4.096 MHz).

Upon receiving the output, the high-speed correlator 16 performs its product:sum operation with the high-speed clock of 1.6 GHz. In this case, the spread code (PN code) is successively received from the code generator 13 with the clock of 1.6 GHz. Here, the code generator 13 may be a code register. The generating and reading of this code are controlled by the same controller 12.

Additionally, the multiplying operation performed by the high-speed correlator 16 comprises outputting the data (multiple bits) from the memory section as it is when the spread code is "1", and comprises outputting the reverse of the multiple bits when the spread code is "0".

As a result, the data reading from the S/H circuit 15 and the product sum operation processing by the high-speed correlator 16 are completed within a time of $\frac{1}{100}$ of the time used for writing one symbol. Therefore, when another symbol is stored in another S/H string of the memory section, the correlation can also be obtained successively by the high-speed correlator 16.

Actually, there are a considerable number of symbols to be processed at the same time. For the signals to be stored in the memory section as the reception signals in symbol units, when the number of antennas is two, there are six signals in total in terms of complex modulation signals (I/Q) and delay wave components, and further 24 to 48 signals in total when considering a plurality of channels for control and traffic.

Additionally, during diversity hand off (DHO), since another base station has to be captured at the same time, the number becomes one to two-fold. One-fold means that by omitting a part of signal reproduction of the base station which is now executing communication, for example, by reducing the number of paths, DHO is executed without increasing hardware.

Moreover, the spread code is complexed/modulated. Furthermore, for multiple codes transmitted at the same time by changing the spread code, and for the long code mask symbols of the first and second perches, the operation of setting the same input signal and changing only the code to obtain the correlation output needs to be performed.

Therefore, to use the usual SC and obtain the correlation, the necessary number of SCs is at least 96 to four or five times, about 500.

Furthermore, a searcher is also necessary to obtain synchronization, but a matched filter (MF) system is usually used in the searcher, and the hardware scale becomes 100 to 300 times as compared with SC.

Specifically, about 200 gates of SC, and about 60 k gates of MF with the same operation precision are necessary. However, since the operation precision of data demodulation of W-CDMA is unnecessary in the operation of the searcher, about 10 k gates are sufficient. Moreover, a searcher is necessary for each antenna, and another searcher is sometimes necessary for handing DHO.

In the above-described situation, when the present circuit is used, the memory section has to be newly installed, but the number of high-speed correlators can be of a single digit, and the hardware scale can remarkably be reduced.

As described later, since the searcher for capturing the synchronization is unnecessary, the hardware scale can further remarkably be reduced.

Additionally, the S/H circuit has been described as the memory section, but any other memory can of course be used as long as it satisfies the following conditions. As a first condition, the data writing speed and reading speed can be varied. As a second condition, the data reading and writing can simultaneously be performed. As a third condition, the length of bit per sample is one bit or more, or in the range of four to six bits if possible, and simultaneous writing and reading can be performed in a sample unit. Furthermore, as the following desirable condition (fourth condition), reading can be performed also in a symbol unit (this is to handle a matched filter system described later).

Therefore, a two-port dynamic random access memory (DRAM) can sufficiently be used, and the remarkable reduction of chip occupation area or power consumption can be realized as compared with the S/H circuit obtained by assembling digital flip-flop (F/F).

Figure 2:
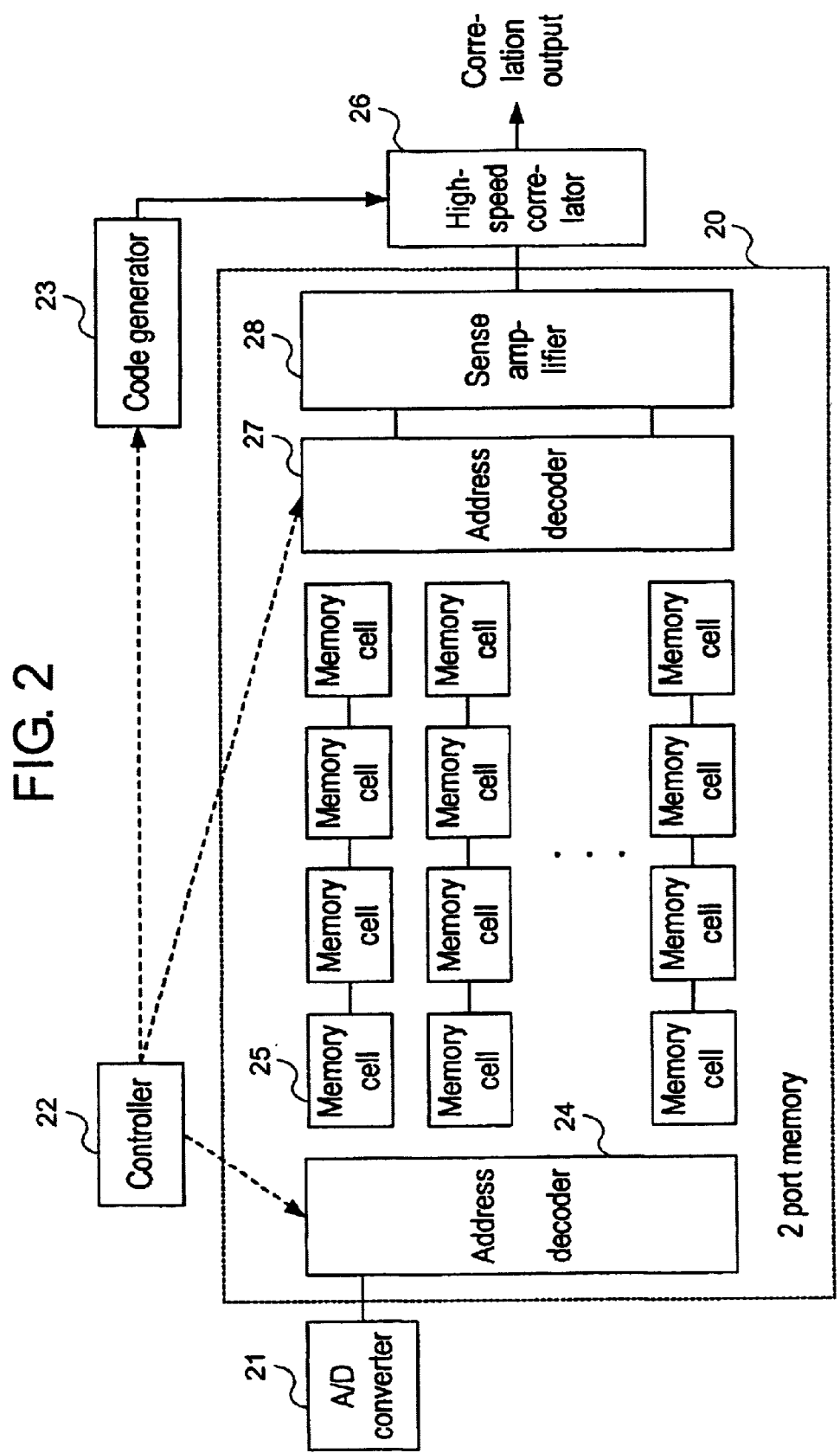
FIG. 2 is a block diagram of another spread spectrum communication correlation circuit according to the embodiment of the present invention.

The use of a two-port memory cell instead of the S/H circuit in the spread spectrum communication correlation circuit according to the embodiment of the present invention will be described with reference to FIG. 2. FIG. 2 is a block diagram of an other example of the spread spectrum communication correlation circuit according to the embodiment of the present invention.

As shown in FIG. 2, the circuit is constituted of an A/D converter 21, a controller 22, a code generator 23, a two-port memory 20 and a high-speed correlator 26, and the two-port memory 20 is constituted of an address decoder 24, a plurality of memory cells 25, an address decoder 27, and a sense amplifier.28.

Here, the A/D converter 21, the code generator 23, and the high-speed correlator 26 have constitutions similar to those of the A/D converter 11, the code generator 13, and the high-speed correlator 16 shown in FIG. 1.

The circuit is different from the circuit of FIG. 1 in the two-port memory 20 and the controller 22. These will be described hereinafter.

In the same manner as the S/H circuit 15, the memory cell 25 in the two-port memory 20 receives and holds one symbol of digital input signals written for each sample from the A/D converter 21 via the address decoder 24, and one symbol of signals are read by the address decoder 27 for each sample.

The address decoder 24 writes the digital signal inputted from the A/D converter 21 to the memory cell 25 with the clock of 16 MHz in accordance with the address inputted from the controller 22.

Moreover, the address decoder 27 reads data from the memory cell 25 with the clock of 1.6 GHz in accordance with the address inputted from the controller 22 and transmits an output to the sense amplifier 28.

The sense amplifier 28 compares the data inputted from the address decoder 27 with a reference value, amplifies the data to provide a high (H) or low (L) output at a clock timing, and transmits the output to the high-speed correlator 26.

The controller 22 controls the code generator 23 to transmit the spread code (PN code) to the high-speed correlator 26, and additionally transmits the address of the memory cell 25 to be accessed for writing or reading to the address decoders 24, 27.

The operation of the circuit in FIG. 2 will be described. The reception signal is converted to a digital signal by the A/D converter 21, and the address decoder 24 writes one symbol of converted digital signals into the address of the memory cell 25 designated by the controller 22 with the clock of 16 MHz. After one symbol is written, the next symbol continuously starts to be written. The address decoder 27 reads one symbol of already written data from the memory cell 25 in accordance with the address designated by the controller 22 by shifting for every sample with the clock of 1.6 GHz, and transmits its output to the sense amplifier 28. The sense amplifier 28 amplifies the input signal and transmits its output to the high-speed correlator 26, and the high-speed correlator 26 performs the product sum operation at a high speed with the clock of 1.6 GHz, obtains the correlation and emits a correlation output.

The operation (during usual communication) after the symbol synchronization, radio Slot synchronization, and frame synchronization are established has been described above, and the initial synchronization time in which these synchronizations are not established will next be described.

During the initial synchronization, while the power switch of a mobile unit is turned on, the symbol synchronization, radio slot synchronization, and frame synchronization ate not established, and the synchronization has to be specified in this state.

In ARIB specification, the initial synchronization is established as follows:

As a first step, the chip synchronization, symbol synchronization, and radio slot synchronization are established.

First, by detecting the long code mask symbol of the first perch the chip synchronization, symbol synchronization and radio slot synchronization are established.

As the conditions in the following description, the chip rate of the first perch is 4 Mcps, the spread ratio is 256, and the signal input from the A/D converter 21 is subjected to fourfold over-sampling (16 Mcps) with six bits.

Furthermore, the constitution and operation during the initial synchronization will be described in the following (A) to (N). Additionally, the description is based on the example of FIG. 1, but the concrete constitution and data reading speed precision of each component are different from those of FIG. 1, and high function and precision are used.

(A) The memory section has 1024 taps (image in which 1024 sets of six bits are horizontally arranged)+α (several taps).

(B) Outputs from the A/D converter 11 are successively written to this memory section. For the writing speed, the clock of 16 MHz is used.

(C) After exactly 1024 taps (exactly for one symbol of perch channel) are written, reading is successively performed from a first tap at a speed of 16.384 GHz (1024 times 16 MHz), and inputs are transmitted to the high-speed correlator 16. The writing in 16 MHz is continuously advanced.

(D) The high-speed correlator 16 performs its product sum operation with the clock of 16 GHz. At this time the spread code is a common short code.

(E) Since the speed of the high-speed correlator 16 is 1024 times as fast as the sample speed, exactly one sample time is required to complete the obtaining of the correlation for one sample. At the time of completion, since the writing is performed at a speed of 16 MHz, one sample of new input data is taken.

(F) Subsequently, since one sample is shifted to start the reading from the first (first one tap) in the above stage (C), the reading is now started from the second tap, one symbol of data up to 1025-th tap is read at 16 GHz, and the product sum operation is performed in the high-speed correlator 16. The addition circuit of the high-speed correlator 16 performs its operation after the final result in the stage (D) is cleared.

(G) When the operation is successively performed from the first in this manner and repeated 1024 times, one symbol of correlation outputs can be obtained.

(H) Since the time for completing the above stage (G) exactly corresponds to one symbol time, by successively repeating the operation, the correlation output can be obtained with respect to the next symbol.

(I) The long code symbol spread with a short code is inserted only once in ten symbols, the operation has to be repeated for at least ten symbols to look for the nearest base station (0.625 ms/10 symbols). Additionally, this required time is unchanged from the case in which the usual MF is used.

(J) Additionally, 1024 taps in the memory section are sufficient in principle, but there is provided an allowance because the taps must not be deleted in the relation with signal processing delay. After 1025 taps are completely written, renewal may be performed by returning to the first tap.

(K) When at least ten symbols are checked in this manner, radio slot synchronization can be obtained from the chip synchronization and symbol synchronization of the present base stations including adjacent base stations and the position of the long code mask symbol. When the clock is of 16 GHz, the processing can be performed within real time with one high-speed correlator. This processing is performed by a profiler, so that the logic for comparing and detecting the strongest correlation output and the time are specified.

Of course, when communication situation is deteriorated, and when judgment cannot be made only with ten symbols (corresponding to one radio slot) of data, the next ten symbols are also used for the judgment. In the profiler, the result for each sample of the same phase in one radio slot is added or processed otherwise to perform the judgment. In any case, the above-described operation processing may continuously be repeated.

(L) When the clock is of 16 GHz, one high-speed correlator is sufficient. However, when such a fast clock cannot be used, a plurality of high-speed correlators are prepared. For example when operation cannot be performed only with the clock of about 1 GHz, 16 high-speed correlators in total are necessary.

(N) In this case, some proposals are considered for a reading method from the memory section and a taking method into a plurality of high-speed correlators. These will be described hereinafter in (i) to (iv).

(i) In the same manner as with 16 GHz, reading is successively performed from first to 16-th high-speed correlators for each tap (one sample) of one symbol (1024 taps), for 17-th and subsequent samples the reading is successively performed from the first to 16-th high-speed correlators, and finally the reading for one symbol is performed.

The sampling into the high-speed correlator will concretely be described. The first high-speed correlator operates from a first sample, and the second high-speed correlator operates from a second sample. Also from a third and subsequent samples, the operation is similarly executed. The 16-th high-speed correlator starts sampling from the 16-th sample. The code inputted to the 16 high-speed correlators may be the-same (including the phase).

In this case a problem is that the high-speed correlators other than the first correlator cannot obtain all correlation for one symbol. For example, the second correlator takes the correlation for 1023 samples, and the 16-th correlator takes the correlation for 1024−15=1009 samples.

A so-called partial correlation is obtained, but the 16-th correlator has only an attenuation of 2% or less, which is not a problem considering from the purpose of taking the initial synchronization.

(ii) In the memory section 1024+16 taps (samples) are stored, and the first to 16-th high-speed correlators are used to perform reading for each sample. After this is completed, the first to 16-th high-speed correlators are used from the 17-th sample to perform reading for each sample, and by repeating the similar processing 1040 taps are read. In this case, all 16 high-speed correlators can obtain the correlation for 1024 samples, that is, one symbol.

For the concrete sampling method, in the same manner as in (i), the first high-speed correlator takes the first to 1024-th samples, and the second high-speed correlator takes the second to 1025-th samples. In this case, however, the reading speed from the memory section and the operation speed in the high-speed correlator needs to be accelerated only for 16 taps. Moreover, for the number of taps to be first accumulated in the memory section, 16 samples more than for one symbol need to be accumulated, and the memory capacity is slightly increased.

Also in the above-described case, the spread code given to each high-speed correlator is the same including the phase.

(iii) The reading from the memory section is performed in the same manner as in (i). For the sampling to all the high-speed correlators, the same sample is taken at the same time. However, the spread code to each high-speed correlator is given by changing the phase for one sample time. Specifically, the codes are successively supplied to the first high-speed correlator from the first code (the same as that of the first sample),and the codes are successively supplied to the second high-speed correlator from the code of the second sample, finally returning to and finishing at the first sample.

In this case, a problem is that the second and subsequent high-speed correlators take the correlation over the symbols, but only the long code mask symbol is spread with a short code. Therefore, even when another symbol is straddled, the straddled portion simply forms a noise, and the amount is extremely low at 2% or less, which is not a problem considering from the purpose of taking the initial synchronization.

(iv) In the above system, only one face of memory is prepared, but multiple faces of memories are necessary as described above, and at least 24 or more faces are necessary.

After 22 faces of memories are prepared, first ten symbols (one radio slot) are accumulated in the first half, that is, eleven faces. When the accumulation is completed, the reading of ten symbols is started for each symbol from the top of one symbol, for example, at a speed of 1.6 GHz which is 100 times as fast as the sample speed. The outputs of ten symbols are received by ten high-speed correlators. In this case, the same spread code is used.

After the reading of one symbol and the operation in the high-speed correlator are completed, the processing of one symbol is repeated from the next sample. When the operation is completed 1024 times, the correlation outputs of one symbol are obtained for ten symbols. At this time, the information of the next radio slot (ten symbols) are stored in the latter-half eleven faces of memory mat.

Here, it is assumed that the first information in the first-half eleven-face memory mat has the same content as that of the first information of the latter-half eleven-face memory mat. Therefore, simultaneous writing is performed on both memories, and the information of the first memory mat always constitutes the first information in one radio slot. This means that when the memory mat has 21 faces in total, new information may be written to the memory mat in which the reading is successively completed. After the processing of one radio slot is completed, with respect to the second radio slot, the same high-speed correlator is used to use the information from the eleven-face memory with new information accumulated therein and to repeat the same operation so that the correlation of the next radio slot can be obtained.

Since the hardware scale of MF occupies the half of the demodulating section, the scale reduction to ⅒ is extremely effective for reducing the LSI price.

Next, the specifying of the long code group will be described as a second step.

When the radio slot synchronization can be established, the place where the long code mask symbol of the second perch is present can be known and the information is taken into the memory. Actually, since the symbol is present in the same position as that of the long code mask symbol of the first perch, the information can be obtained in the same position.

Subsequently, the information taken into the memory is read at a high speed, for example, using the clock of 1 GHz or 16 GHz. Specifically, the first to 1024-th samples are successively read. In this case, since the symbol synchronization is established, the first sample is sure to be the top of the symbol. When the information read from the memory is processed by using the high-speed correlator and changing 16 types of spread codes, the correlation can be obtained somewhere, so that the long code group can be specified.

To specify this long code group, even in the operation with the clock of 1 GHz, the operation can be completed only in 16 $\mu$s with one high-speed correlator. Additionally, one symbol time is 62.5 $\mu$s.

The specifying of the long code and the establishing of the frame synchronization will next be described as a third step.

When the radio slot synchronization can be established, the position in which the pilot symbol of the first perch is present can be known, and the information is taken into the memory. In this case the information for two symbols may be taken, but if there is any free memory, all of four pilot symbols may be taken.

When the sampling of information is completed, the high-speed reading is performed in the same manner as in the second step. There are 32 types of long codes including a phase difference in total within one long code group, and 16 phases are present because 16 radio slots are repeated. Therefore, even when one correlator is used by changing the long code, the long code can be specified in 32 (32 types)×16 (16 phases)×4 (pilot for four symbols)×1 (1 $\mu$s: time for obtaining the correlation for one symbol [1024 samples] with 1 GHz clock)=2048 $\mu$s (about 2 ms).

When the usual correlator is used to specify the long code in real time, and since the pilot symbol exists only four times in ten symbols for one symbol time (64 $\mu$s)×32 (32 types)× 16 (16 phases)=32768 $\mu$s (about 33 ms), 2.5 (10/4) times, that is, 80 ms or more (about 33 ms×2.5) is required. Therefore, as compared with the conventional correlator, when the present circuit is used, a remarkable time reduction can be realized.

As described above, it can be seen that what has to be processed at a high speed is actually only the first step. As an actual problem, even when the process (CMOS 0.18 $\mu$m) which can be placed in practical use in 2001 is used, it is difficult to generate the clock of 16 GHz. As described above, the problem can be solved by using a plurality of high-speed correlators, but another proposed method to be performed may comprise thinning out the operation of the first step in point of time, and lengthening the time until the long code mask symbol is found.

A required time for each step in an ideal state is shown as follows. As a condition, the 1 GHz clock can be used.

First step: 0.625 ms (the same as the conventional system)
Second step: 0.016 ms (0.625 ms for one radio slot in the conventional system)
Third step: 2 ms (80 ms in the conventional system)

In actuality, since one radio slot is necessary for one processing, the time is represented in a radio slot unit.

First step: 1 (the same as the conventional System)
Second step: 1 (the same as the conventional system)
Third step: 4 (32×16=512 (512 radio slots×0.625 ms=320 ms) in the conventional system, and to further precisely perform the processing, four or five times as much as the time is required)

In any case, the time of the third step is a main problem, and in the present circuit, the time of the third step is remarkably reduced. Therefore, even when the time of the first step is raised by one digit, the present circuit is still superior to the conventional system.

An example in which the time of the first step is increased by one digit, and, for example, 10 times the time is used to perform the processing will next be described.

In the memory section ten symbols of data can be taken, and first two symbols of data are taken with the usual clock with a speed of 16 MHz. The clock for reading is of 1.6 GHz. Additionally, when the number of high-speed correlators is increased, for example, to ten, the clock for reading can be of 160 MHz using the above-described system.

The information from the memory section is received by one high-speed correlator with the clock of 1. GHz, and operation is performed for one symbol (1024 samples) with the clock of 1.6 GHz. Subsequently, one sample is shifted and the similar processing is performed. This is performed 1024 times, and the correlation for one symbol is obtained. Moreover, subsequent to the two symbols (first, second symbols) of data, the next two symbols (third, fourth symbols) of data are taken into the memory section. Subsequently, the data of the second and third symbols are used to operate the correlation of the second symbol. The similar operation is repeated to obtain the correlation with respect to the third to tenth symbols.

Subsequently, in the processing time for the ten symbols, in the stage where the processing for nine symbols is completed, the information of the second symbol, out of the information for the next ten symbols in one radio slot, start to be written in the memory. At the time the reading of the information of the first ten symbols is completed, writing is completed. When this is repeated ten times, to obtain all correlation for ten symbols, the time for 100 symbols, that is ten times the time can be used to complete the processing. Even in this case, the total of the first to third steps is within 20 radio slots, thereby providing a remarkable improvement.

Consequently, even with the clock of 160 MHz possible even in the current process, by preparing ten high-speed correlators and two faces of memories, the initial synchronization time can remarkably be improved by 1/10 or more. Moreover, when the number of mats of the memory section is increased, the above-described system can be performed together with the system of (iv), and further improvement can be attained. Particularly, this contributes to the time improvement of the third step.

The operation during diversity hand over or diversity hand off (DHO) will next be described.

When the. environment of communication with the base station being communicated (the current base station) is deteriorated (in many cases the base station being communicated is far away and a close base station is approaching), and when better communication environment is obtained in the communication with the close base station, first the close base station is found, and the communication with the close base station is started. In this case, the same information as that from the current base station is requested to be transmitted from the close base station, and both information are received. Specifically, cell diversity reception is performed, and continued until each level of both reception signals reaches a predetermined value or more. Thereafter, the communication with the current base station is disconnected, thereby shifting to the communication state with the new adjacent base station. This is called soft hand over or soft hand off, and the communication can be realized without being discontinued. As described above, to perform the cell diversity reception and the soft hand over or the soft hand off means DHO.

In the ARIB specification, all the base stations asynchronously operate. Therefore, for the process of establishing the chip synchronization, symbol synchronization, and radio slot synchronization of the adjacent base station, the processing similar to that of the initial synchronization is necessary. Therefore, new hardware is usually added for DHO. Specifically, a separate antenna is used, and directed to the close base station, and other countermeasures are employed.

Here, a system in which hardware idle time is utilized to perform DHO will be described.

Additionally, even in the hardware construction not adapted to the DHO, as described above a large number of memories and a large number of sliding correlators for inversely converting (demodulating) the information are installed. These numbers reach the maximum when the power switch of the mobile unit is turned on and the perch channel is captured. When the operation is completed, most of the memories and sliding correlators may be halted. When this is used during the DHO, the information from the handed over base station can be demodulated without any problem.

Figure 3:
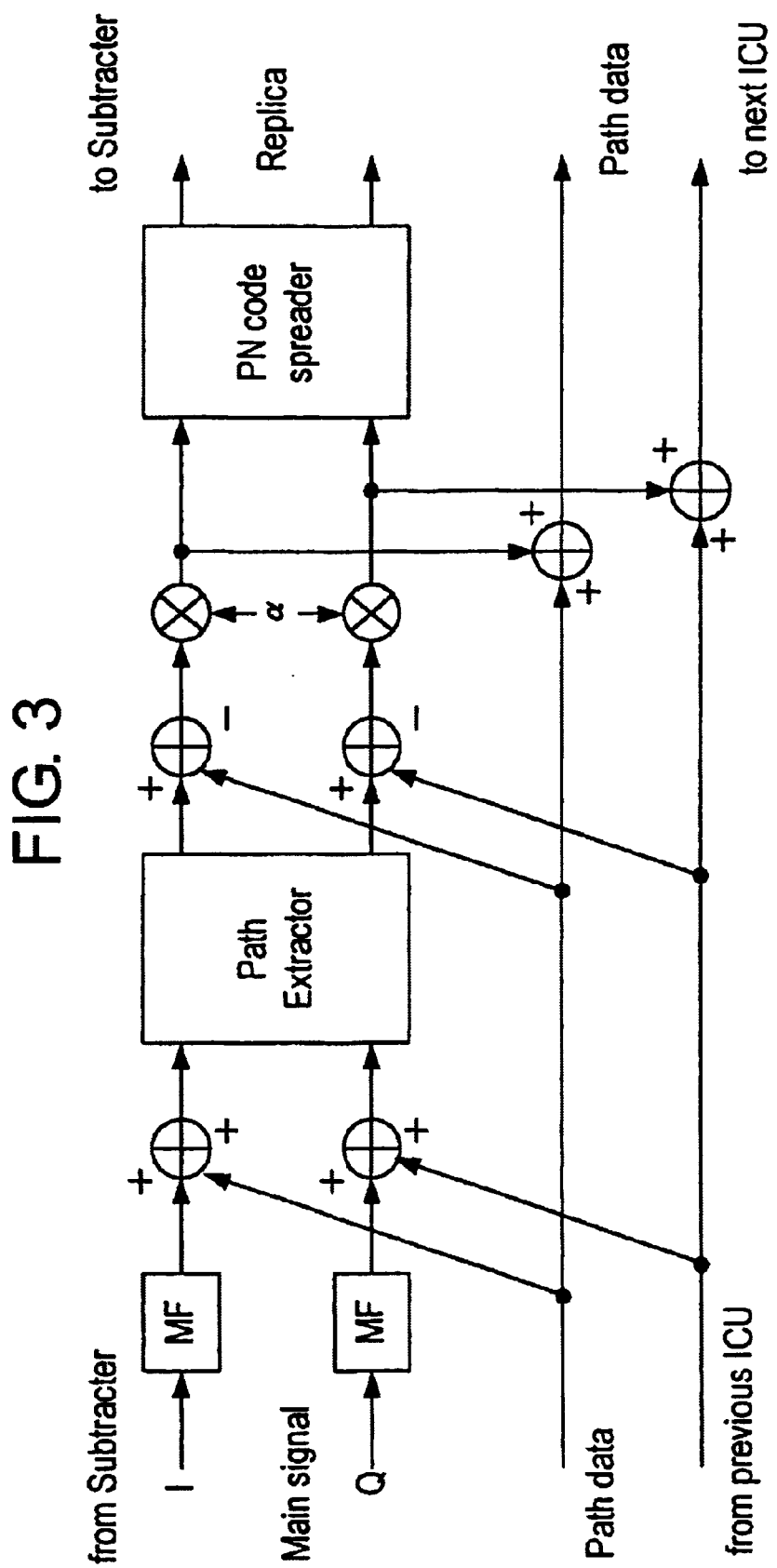
FIG. 3 is a block diagram of the circuit used in an interference canceler unit.
Figure 4:
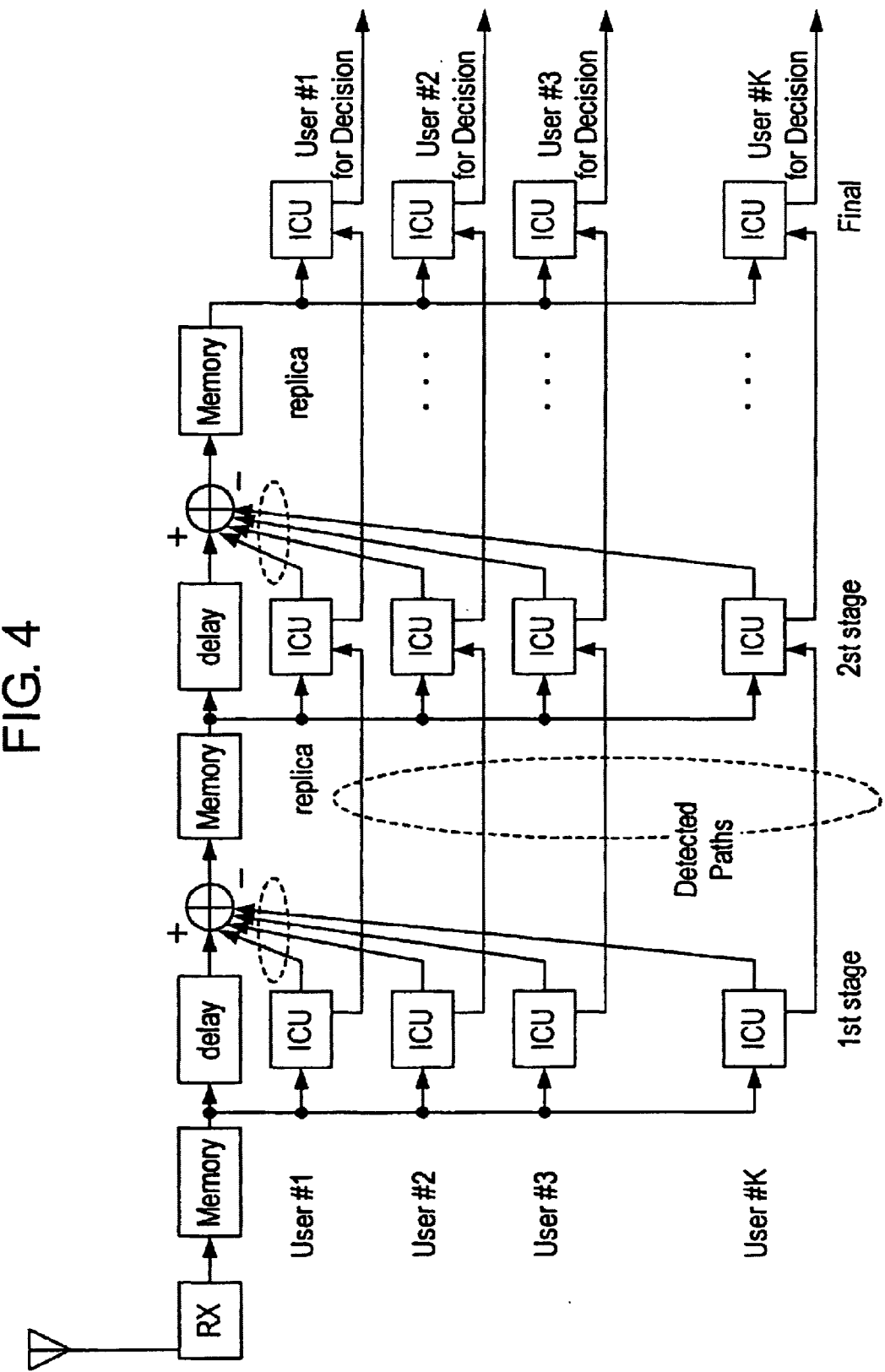
FIG. 4 is a block diagram of the circuit used in an interference canceler.

The use of the present circuit as an interference canceler will next be described with reference to FIGS. 3 and 4. FIG. 3 is a block diagram of the correlation circuit according to the embodiment of the present invention which is used in an interference canceler unit. FIG. 4 is a block diagram of an interference canceler using the interference canceler unit according to the embodiment.

As shown by the constitution of FIG. 3, the interference canceler unit (ICU) is provided with MF, and further as shown in FIG. 4, the interference canceler is constituted of a large number of ICUs, thereby resulting in the enlargement of LSI scale and the increase of LSI number.

Specifically, the number of users×the number of stages× integral multiple of MFs are necessary, the number of users is 300 or 600, the number of stages is at least three, and the integer is at least four or eight. Therefore, 3000 to 10000 MFs are necessary.

In the embodiment, the present circuit which can perform a high-speed operation processing is implemented in the above-described MF section, and the number of MFs is remarkably reduced.

Moreover, as shown in FIG. 4, the memory sections are disposed in the subsequent stages of the receiver (RX) and two adders (+), and the time conversion of processing speed is performed between the receiver and a delay circuit (Delay) or a plurality of ICUs, between the adder and the delay circuit or a plurality of ICUs, and between the adder and a plurality of ICUs.

Therefore, the matched filter (MF) shown in FIG. 3 performs a high-speed product sum operation processing as compared with the usual MF.

Additionally, the basic concept of the present patent lies in a correlator using the time conversion by the memory, and the effect is unchanged if the following concept is introduced.

(1) The high-speed reading using the high-speed correlator and the reduction of clock speed by a multilayered clock during the operation. In this case, since the number of high-speed correlators is increased, the reduction of power consumption does not directly result.

(2) Variable multiple of over-sampling. In the initial state, twice over-sampling is performed, and after substantial definition, fourfold over-sampling is performed.

Figure 6:
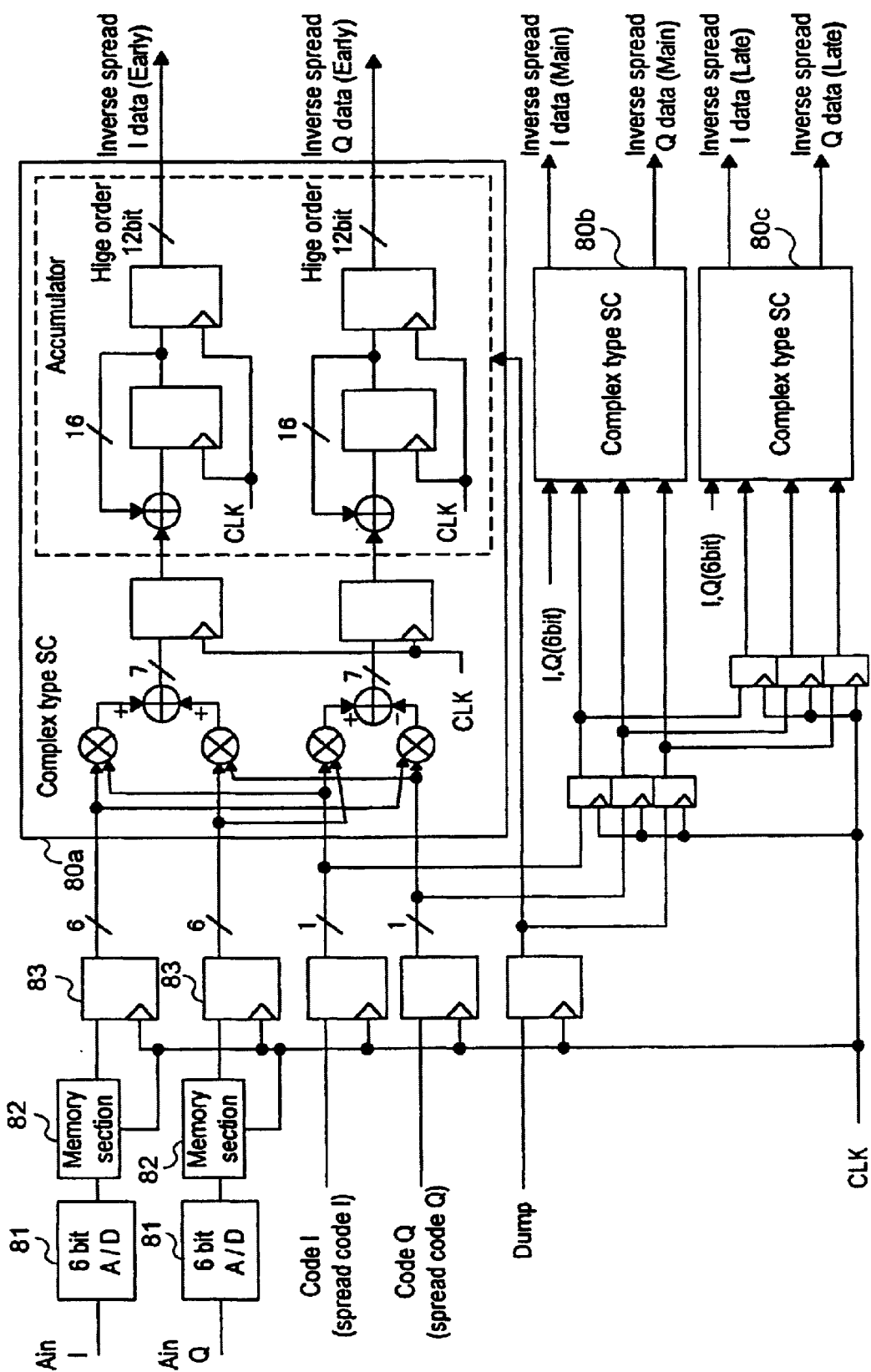
FIG. 6 is a circuit block diagram showing a high-speed correlator of a complex type in the spread spectrum communication circuit according to the embodiment of the present invention.

(3) The constitution of the high-speed correlator and MF (product sum operator) is set to be a complex type, As shown in FIG. 6, the complex high-speed correlator (complex type high-speed SC) is constituted of four high-speed correlators in principle, but by designing hardware, the hardware scale becomes less than four times, and about twice the scale can constitute the hardware. Additionally, FIG. 6 is a circuit block diagram showing the high-speed correlator designed in the complex type in the spread spectrum communication circuit according to the embodiment of the present invention. However, in FIG. 6, two correlators are disposed in one complex type high-speed SC, because the addition/subtraction of I, Q signals multiplied by the spread code is performed in the previous stage of the correlator. Therefore, four correlators do not need to be used for four I, Q signals, and the signals can be processed with two correlators.

Specifically, in complex multiplication, time addition is performed as shown in the following equation:

$$(A_I+jA_Q)(C_I+jC_Q)=A_IC_I-A_QC_Q+j(A_IC_Q+A_QC_I)$$

When the type is not complex, one correlator performs AC time addition, but in the complex type, four correlators are usually used to perform the time addition of $A_IC_I$, $A_QC_Q$, $A_IC_Q$, $A_QC_I$ and subsequently perform the. addition/ subtraction. Logically, four correlators are necessary. In the example shown in FIG. 6, after $A_I C_I - A_Q C_Q$ and $A_I C_Q + A_Q C_I$ are operated, the time addition is performed, so that the hardware scale can be reduced.

Additionally, the content of FIG. 6 will be described. In the complex type constitution, 6-bit A/D converters 81 for inputting spread spectrum signals and converting analog signals to digital signals are disposed for I-phase signal and Q-phase signal, and memory sections 82 for holding the digital signals outputted from the 6-bit A/D converters 81 and transmitting outputs at a high speed are disposed. Furthermore, a plurality of latch circuits 83 are disposed for adjusting the timings of data, codes and other signals to be inputted to complex type SCs 80a, 80b, 80c by clocks (CLK).

According to the spread spectrum communication. correlation circuit of the embodiment of the present invention, the spread spectrum reception signal is A/D converted with the clock of 16 MHz, one symbol of the signals are written into the memory section, and one symbol of data is read a plurality of times with the clock of 100 to 1000 times, that is, 1.6 GHz to 16 GHz. Additionally, while one symbol of data is written to the memory section, one symbol of read data is subjected to a high-speed operation processing in the high-speed correlator, so that the number of constituting elements is reduced and the correlation output can effectively be obtained.

Figure 5:
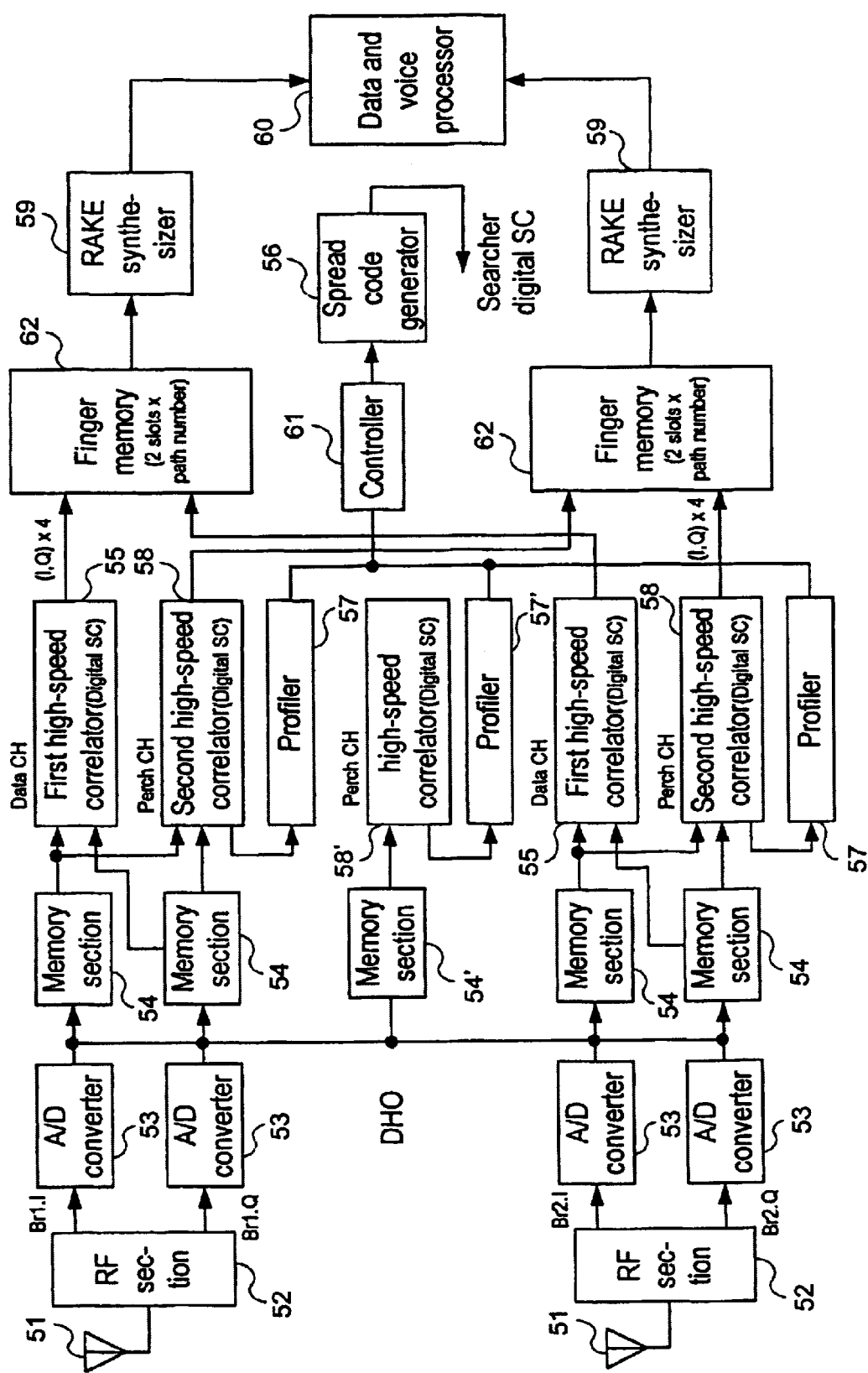
FIG. 5 is a block diagram showing a concrete example of the spread spectrum communication circuit according to the embodiment of the present invention.

The concrete and basic circuit constitution of the demodulating section using the present circuit will next be described with reference to FIG. 5. FIG. 5 is a block diagram showing the concrete example of the demodulating section of the spread spectrum communication correlation circuit according to the embodiment of the present invention.

As shown in FIG. 5, the demodulating section of the embodiment is basically constituted of an antenna 51, an RF section 52, an A/D converter 53, a memory section 54, a first high-speed correlator 55, a spread code generator 56, a profiler 57, a second high-speed correlator 58, a RAKE synthesizer 59, a data and voice processor 60, a controller 61, and a finger memory 62.

Each component of the demodulating section shown in FIG. 5 will next be described concretely.

Two antennas 51 are usually prepared to perform the diversity reception. The diversity reception comprises receiving the same transmission signal with two antennas, and synthesizing a demodulated result to enhance a reception sensitivity.

The radio frequency (RF) section 52 generates (demodulates) a base band (BB) signal, and performs orthogonal wave detection to separate I component (in-phase component) and Q component (orthogonal component).

The A/D converter 53 converts the BB analog signal from the RF section 52 to the digital signal. The necessary number of conversion bits is four to six bits. The conversion frequency is 16 MHz with the fourfold over-sampling in the wide band CDMA (W-CDMA). One A/D converter is necessary for the I/Q signal and each antenna, but when a high-speed processing can be performed, by executing a time-division processing, one A/D converter is sufficient.

The memory section 54 holds at least one symbol of digital signals converted by the A/D converter 53 in the symbol unit, and reads the signals at a high speed. The writing speed is about one to four times the chip speed, and the reading speed needs to be ten or more times the chip speed. In this processing, so-called time conversion is performed. Specifically, a memory capacity for at least 48 to 100 symbols is necessary.

Additionally, when the matched filter (MF) is used instead of the high-speed correlator, collective reading in the symbol unit is required.

Moreover, there is provided a memory section 54 for DHO.

The first high-speed correlator (digital SC) 55 takes the spread spectrum signal held by the memory section 54 and the spread code from the spread code generator 56, and performs its product sum operation for one symbol unit. As compared with the chip rate, a high-speed operation is performed.

Moreover, the second high-speed correlator (digital SC) 58 performs the operation similar to that of the first high-speed correlator 55, but the operation result of the second high-speed correlator is transmitted to the profiler 57.

Additionally, the matched filter (MF) may be used instead of the second high-speed correlator 58.

Moreover, there is provided a high-speed correlator 58' for DHO.

The spread code generator 56 transmits the designated spread code with the designated phase according to the instruction from the controller 61. Additionally, the register for storing the spread code may be used instead of the spread-code generator.

The profiler 57 takes and operates the output from the second high-speed correlator 58 (or MF), and specifies the path. Thereby, in the stage of initial synchronization, the chip synchronization, symbol synchronization, radio slot synchronization, and frame synchronization can be taken, and the base station can be specified.

Furthermore, in the communication state in which the base station to be connected is determined, the path is detected. These information are transmitted to the controller 61, and the controller 61 transmits its instruction to the first high-speed correlator 55, the memory section 54, and the spread code generator 56.

Moreover, there is provided a profiler 57' for DHO, and during DHO, the adjacent base station and the path are specified.

The MF used instead of the second high-speed correlator 58 takes the spread spectrum signal and the spread code, and performs its product sum operation in one symbol unit. As compared with the chip rate, a high-speed operation is performed. By performing the high-speed operation the information from a plurality of memories can be processed at an extremely high speed, so that the application to the interference canceler can be realized.

The RAKE synthesizer 59 performs the phase correction using the pilot symbol on the correlation output taken by the finger memory 62 from the first high-speed correlator 55, and subsequently performs the synthesis of complex path (RAKE synthesis).

Moreover, the RAKE synthesizer 59 additionally includes AFC for adjusting the reception signal and frequency, SIR measuring section for measuring the current proportion of the reception signal and noise (including the interference from other signals), and the like.

The data and voice processor 60 performs the inverse conversion (demodulation) of various signal processings performed to correct errors on the transmission side. In this there are deinterleave, Viterbi decoding, CRC decoder, Reed Solomon code (or turbo decoding), voice CODEC, and the like.

As described above in detail, according to the spread spectrum communication correlation circuit of the embodiment of the present invention, the CDMA demodulation circuit can be constituted with a small gate scale, and there is an effect that in near future the mobile terminal LSI which can obtain correlation with a small scale can be developed.

According to the present invention, the spread spectrum communication correlation circuit can simultaneously perform writing and reading of the received spread spectrum signal, is further provided with the memory section which can perform reading at a speed higher than the writing speed, takes the signal from the memory section at a high speed, and performs the product sum operation in the high-speed correlator, so that the scale of the constituting elements is reduced and the correlation can effectively be obtained.

Another embodiment of the present invention will next be described with reference to the drawings.

The spread spectrum communication correlation circuit according to the embodiment of the present invention repeats a processing a plurality of times, comprising temporarily storing in a memory section a spread spectrum signal transmitted from a receiver, which is obtained by processing the signal with a spread code usually at a so-called chip time interval and spectrum-spreading the signal, reading the stored spread spectrum signal from the memory section by a time converting logical section via a plurality of taps at a high speed, and performing a product sum operation of the read signal and the spread code at a high speed, so that the number of constituting elements is reduced and a correlation output can be obtained.

Specifically, at least one symbol of the spread spectrum signals are stored in the memory, further stored in the time converting logical section, read at a high speed, and subjected to the product sum operation with the spread code at a high speed, so that the time conversion of the spread spectrum signal inputted from the receiver is realized.

In the spread spectrum communication correlation circuit according to the above-described embodiment of the present invention, the reading from the memory needs to be performed at a higher speed than the writing speed. In the spread spectrum communication correlation circuit according to the other embodiment of the present invention, the speed of reading from the memory is set to the same as the writing speed, but the reading is simultaneously performed via multiple taps (multiple samples).

The multiple taps are stored in the time converting logical section of the flip-flop (F/F) constitution, and the reading from the logical section is performed at a high speed, so that the operation equal to that of the high-speed reading memory is implemented.

Figure 7:
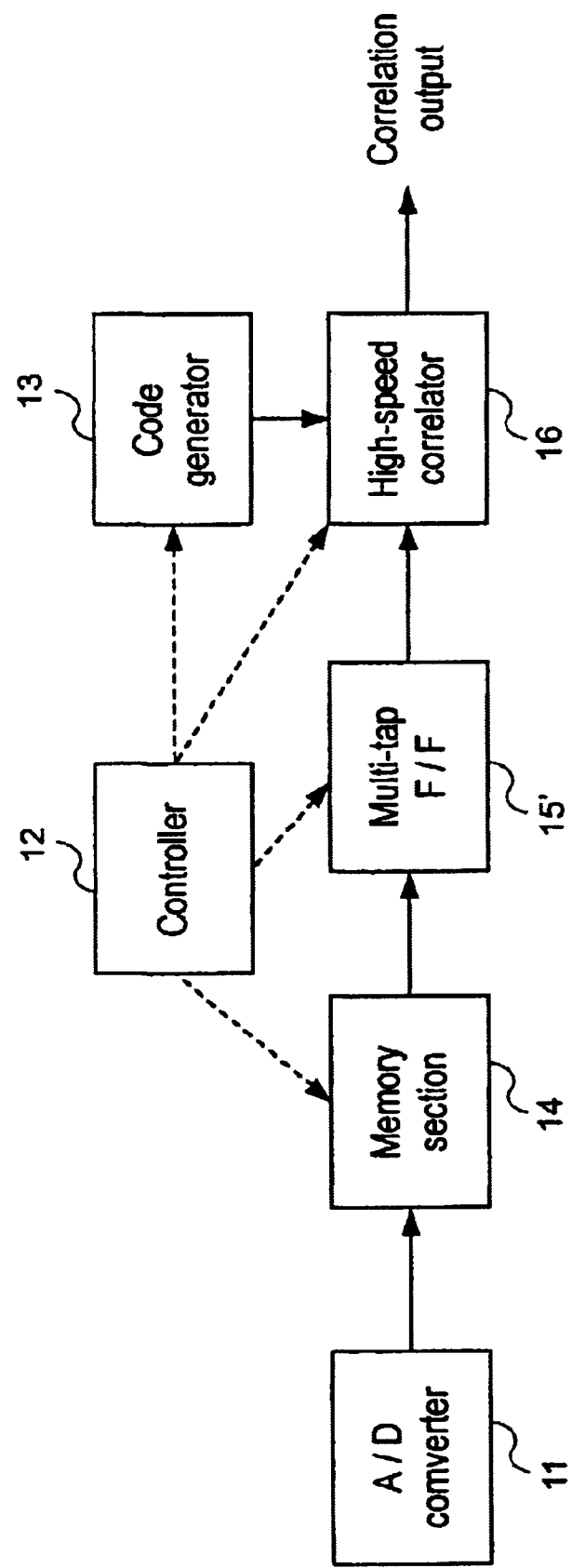
FIG. 7 is a block diagram of the spread spectrum communication correlation circuit according to the embodiment of the present invention.

The spread spectrum communication correlation circuit according to the embodiment of the present invention will next be described with reference to FIG. 7. FIG. 7 is a block diagram of the spread spectrum communication correlation circuit according to the embodiment of the present invention. Additionally, here, a relatively simple operation, that is, the operation (during usual communication) after the symbol synchronization, radio slot synchronization, and frame synchronization are established will first be described.

The spread spectrum communication correlation circuit (the present circuit) of the embodiment is, as shown in FIG. 7, constituted of a code generator 13 for generating a PN code of time series, an A/D converter 11 for inputting a spread spectrum signal modulated by the PN code and converting the analog signal to a digital signal, a memory section 14 for holding the digital signal, a multi-tap F/F 15' for reading and holding data from the memory section 14, a high-speed correlator 16 for performing a high-speed product sum operation processing of the output from the multi-tap F/F 15' and the PN code outputted from the code generator 13, and a controller 12 for controlling input/output of data to the memory section 14, the multi-tap F/F 15', the code generator 13 and the high-speed correlator 16.

The operation of the present circuit during the usual communication will be described.

The memory section 14 plays a role of the memory for temporarily holding the inputted digital signal, and can hold one symbol of data. Subsequently, one symbol of signal data are successively shifted from a top sample and taken into the memory section 14 according to the instruction of the controller 12.

Here, since it is assumed that the symbol synchronization, radio slot synchronization, and frame synchronization are established, the phase in which the top sample of the specific symbol is present is known.

The controller 12 allows the multi-tap F/F 15' to read from the memory section 14 at the current taking speed, that is, at the same speed as the sample speed (about 16 MHz for usual fourfold over-sampling, precisely four times 4.096 MHz) via multiple taps (multiple samples).

Subsequently, the multi-tap F/F 15' performs parallel/serial conversion at a faster speed as compared with the reading speed via multiple taps, and transmits its output to the high-speed correlator 16. This parallel/serial conversion means the time conversion, and the conversion output speed is determined by the precision of the multi-tap F/F 15', the number of over-sampling, and the number of high-speed correlators 16. FIG. 7 shows an example in which one high-speed correlator 16 is disposed, and the number N of taps of the multi-tap F/F 15' is 1024.

Moreover, for example, when the output is transmitted at a speed 16 times the speed of the signal inputted to the multi-tap F/F 15', the number N of taps is 16. When the input signal is inputted at 16 Mcps, the output signal is outputted at a speed of 16 Mcps×N(16)=256 Mcps. In this case, when the number of over-samplings is four, 256 Mcps÷4=64, and 64 high-speed correlators 16 are necessary.

Upon receiving the output, the high-speed correlator 16 performs the product sum operation with the clock having the same speed as the reading speed of the multi-tap. F/F 15'. In this case, the spread codes (PN codes) are successively received from the code generator 13 at the clock speed. Here, the code generator 13 may be a code register. The generating. and reading of this code are also controlled by the same controller 12.

Additionally, the multiplying operation performed by the high-speed correlator 16 comprises outputting the data (multiple bits) from the memory section as it is when the spread code is "1", and comprises outputting the reverse of the multiple bits when the spread code is "0".

Figure 8:
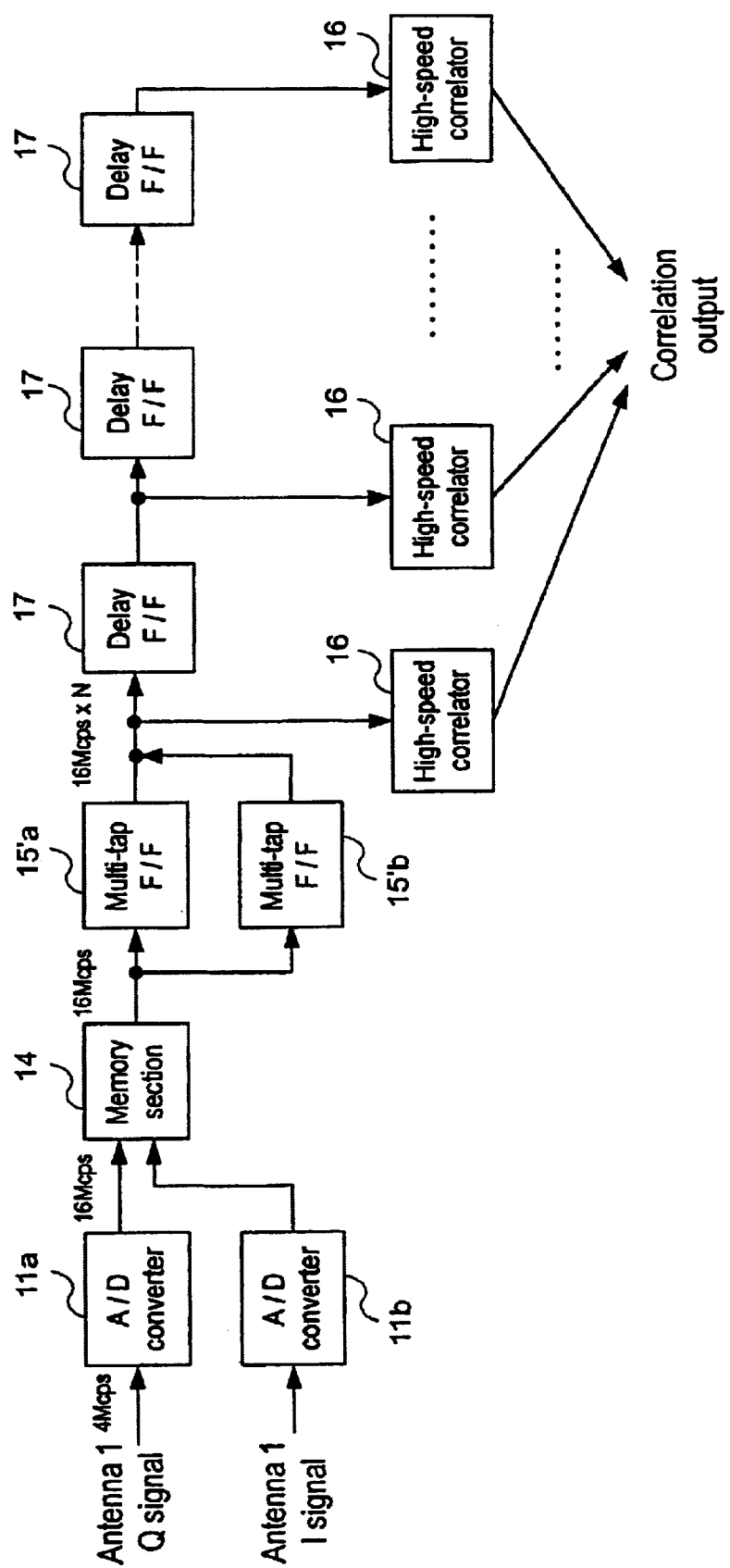
FIG. 8 is a block diagram of another spread spectrum communication correlation circuit according to the embodiment of the present invention.

The provision of a plurality of high-speed correlators 16 will next be described with reference to FIG. 8. FIG. 8 is a block diagram of the complex type spread spectrum communication correlation circuit according to the embodiment of the present invention. Additionally, the controller 12 and the code generator 13 shown in FIG. 7 are omitted for simplicity. However, in the same manner as in FIG. 7, the controller 12 controls the input/output timing to the memory section 14, the multi-tap F/F 15', the high-speed correlator 16, and the delay F/F 17, and the code generator 13 outputs the spread code to the high-speed correlator 16.

The complex type circuit is, as shown in FIG. 8, constituted of an A/D converter 11a for converting reception signal Q from analog to digital, an A/D converter 11b for converting reception signal I from analog to digital, a memory section 14 for storing the digital signals from the A/D converters 11a, 11b, multi-tap F/F 15'a, 15b' for parallel/serial converting the digital signals inputted from the memory section 14, a plurality of delay F/F 17 for successively delaying the digital signals from the multi-tap F/F 15' and outputting, and a plurality of high-speed correlators 16 for receiving the output of the multi-tap F/F, 15' and the output of the delay F/F 17 to perform correlation operation.

Additionally, the delay F/F 17 constitutes a delaying section the high-speed correlator 16 is provided with a multiplying section for performing multiplication with the spread code, and further the outputs from the plurality of high-speed correlators. 16 are all added to obtain the entire correlation output. FIG. 8 does not show the adding section for obtaining the entire correlation output.

Here, two multi-tap F/F 15' are disposed. While one F/F performs writing, the other F/F performs reading, so that the operation is alternately performed.

The reading speed in the memory section 14 is the same as the writing speed, but during reading, a large number of samples are read.

The multi-tap F/F 15' inputs a large number of samples in parallel from the memory section 14, converts the parallel data to serial data, and transmits the data to the high-speed correlator 16 or the delay F/F 17. Since the parallel/serial conversion (time conversion) is performed by this multi-tap F/F 15', only the portion constituted of the digital circuit operates at a high speed.

In the constitution as shown in FIG. 8, real memories such as DRAM and SRAM can be used, and the chip area and price can be reduced.

Figure 12:
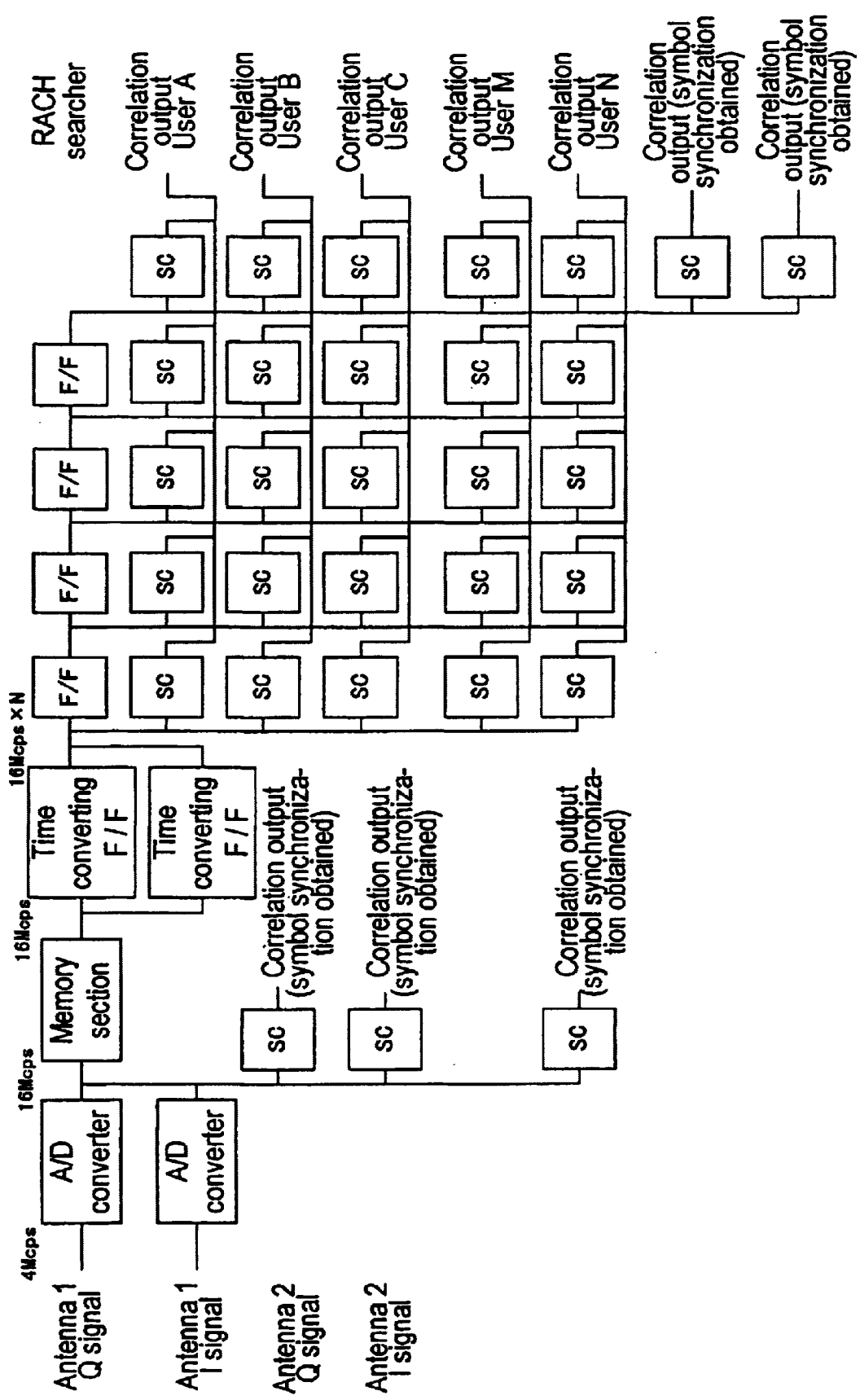
FIG. 12 is a block diagram of another spread spectrum communication correlation circuit according to the embodiment of the present invention.

Moreover, as shown in FIG. 12, when the high-speed correlators (SC) are arranged in matrix a plurality of user information can be demodulated. FIG. 12 is a block diagram of the spread spectrum communication correlation. circuit which can perform demodulation for a plurality of usurers according to the embodiment of the present invention. In this case, SC is operated only with the timing of the necessary reception information, and further SC string can be provided with a function as a searcher, so that the number of operation bits can be reduced.

The relation of the conversion time (multiple), the operation clock frequency (Hz), the number of high-speed correlators (SC), the number of memories when the memory section is constituted of F/F, the number of delay F/F and the number of multi-tap F/F (time converting F/F) in the spread spectrum communication correlation circuit according to the embodiment of the present invention is shown in the following [Table 1].

TABLE 1

| Conversion Time | Clock Frequency | No. of SC | No. of Memory Section F/F | No. of Delay F/F | No. of Time Converting F/F |
|---|---|---|---|---|---|
| 1 | 16M | 1024 | 0 | 2048 | 0 |
| 4 | 64M | 256 | 1536 | 510 | 8 |
| 16 | 256M | 64 | 1920 | 126 | 32 |
| 64 | 1024M | 16 | 2016 | 30 | 128 |
| 256 | 4 G | 4 | 2040 | 6 | 512 |
| 1024 | 16 G | 1 | 2048 | 0 | 2048 |

Actually, there are a considerable number of to be processed as the mobile terminals of W-CDMA at the same time. For the signals to be stored in the memory section as the reception signals in symbol units, when the number of antennas is two, there are six signals in total in terms of complex modulation signals (I/Q) and delay wave components, and further 24 to 48 signals in total when considering a plurality of channels for control and traffic.

Additionally, during diversity hand off (DHO), since another base station has to be captured at the same time, the number becomes one to two-fold. One-fold means that by omitting a part of signal reproduction of the base station which is now executing communication, for example, by reducing the number of paths, DHO is executed without increasing hardware.

Moreover, the spread code is complexed/modulated. Furthermore for multiple codes transmitted at the same time by changing the spread code, and for the long code mask symbols of the first and second perches, the operation of setting the same input signal and changing only the code to obtain the correlation output needs to be performed.

Therefore, to use the usual SC and obtain the correlation, the necessary number of SCs is at least 96 to four or five times, about 500.

Furthermore, a searcher is also necessary to obtain synchronization, but a matched filter (MF) system is usually used in the searcher, and the hardware scale becomes 100 to 300 times as compared with SC.

Specifically, about 200 gates of SC, and about 60 k gates of MF with the same operation precision are necessary. However, since the operation precision of data demodulation of W-CDMA is unnecessary in the operation of the searcher, about 10 k gates are sufficient. Moreover, a searcher is necessary for each antenna, and another searcher is sometimes necessary for handing DHO.

In the above-described situation, when the present circuit is used, the memory section and the multi-tap F/F have to be newly installed, but the number of high-speed correlators can be reduced, and the hardware scale can remarkably be reduced.

As described later, since the searcher for capturing the synchronization is unnecessary, the hardware scale can further remarkably be reduced.

For the memory section, a two-port dynamic random access memory (DRAM) can sufficiently be used, and the remarkable reduction of chip occupation area or power consumption can be realized as compared with the circuit obtained by assembling digital flip-flop (F/F).

The operation (during usual communication) after the symbol synchronization, radio slot synchronization, and frame synchronization are established has been described above, and the initial synchronization time in which these synchronizations are not established will next be described.

During the initial synchronization, while the power switch of the mobile unit is turned on, the symbol synchronization, radio slot synchronization, and frame synchronization are not established, and the synchronization has to be specified in this state.

In ARIB specification, the initial synchronization is established as follows:

As a first step, the chip synchronization, symbol synchronization, and radio slot synchronization are established.

First, by detecting the long code mask symbol of the first perch, the chip synchronization, symbol synchronization and radio slot synchronization are established.

As the conditions in the following description, the chip rate of the first perch is 4 Mcps, the spread ratio is 256, and the signal input from the A/D converter 11 is subjected to fourfold over-sampling (16 Mcps) with six bits.

Furthermore, the constitution and operation during the initial synchronization will be described in the following (A) to (H). Additionally, the description is based on the example of FIG. 8, and particularly the time conversion of 16 times will concretely be described.

(A) The memory section 14 has 1024 taps (image in which 1024 sets of six bits are horizontally arranged)+ α(several taps).

(B) Outputs from the A/D converter 11 are successively written to this memory section 14. For the writing speed, the clock of 16 MHz is used.

(C) After exactly 1024 taps (exactly for one symbol of perch channel) are written, data for 16 taps are transferred at once to the multi-tap F/F 15' (time converting F/F) using the clock of 16 MHz. At the same time with the transfer the sample data for 63 delay F/Fs are transferred to the 63 delay F/Fs 17 from the first of the symbol. In this case,the multi-tap F/F 15', the delay F/F 17, and the high-speed correlator 16 are operated at a clock speed of 256 MHz. Moreover, the writing in 16 MHz to the memory section 14 is continuously advanced. Additionally, although it has been described that the sample data are transferred to the delay F/F 17 from the first of the symbol, this is not limited to the first of the symbol even when simply assumed.

(D) The high-speed correlator 16 performs its product sum operation with the clock of 256 MHz. At this time the spread code is a common short code.

It takes exactly 16 MHz to transfer all the data of 16 taps of the multi-tap F/F 15'a. Within this time 16 pieces of data are transferred to the other multi-tap F/F 15'b from the memory section 14. Then, the 17-th data is transmitted from the multi-tap F/F 15'b.

When this operation is repeated 64 times, the correlation outputs in 64 sample points can simultaneously be obtained from 64 high-speed correlators (SC) 16. When the outputs are held, and switched and outputted in time division every sample time (at 16 MHz), the output equal to that of MF can be obtained.

Furthermore, the accumulation adder in SC16 is reset to again start from the above (C).

At this time, the first 64 pieces of sample data are abandoned, and the data are transferred to the delay F/F 17 and the multi-tap F/F 15' with 16 taps from the memory section 14 from the 65-th data.

By repeating this large movement 16 times, 64 (pieces of sample data)×16 (times)=1024 results, and the correlation outputs for 1024 samples can be taken within one symbol time.

For the information of the memory section 14 when the information for 64 samples are discarded,those for 64 samples are newly stored, and completely renewed.

The spread codes inputted to the high-speed. correlators (SC) 16 are all common, and inputted from the first of the symbol. In the fourfold over-sampling, the codes for four samples are inputted in common to the first tap.

(E) Since the operation speed of the high-speed correlator 16 is 1.6 times the sample speed, time exactly for 64 samples is required to complete the obtaining of 64 correlation outputs for one sample. At the time of completion, since the writing is performed to the memory section 14 at a speed of 16 MHz, 64 samples of new input data are taken.

(F) The long code symbol spread with a short code is inserted only once in ten symbols, the operation has to be repeated for at least ten symbols to look for the nearest base station (0.625 ms/10 symbols). Additionally, this required time is unchanged from the case in which the usual MF is used.

(G). Additionally, 1024 taps in the memory section 14 are sufficient in principle, but there is provided an allowance because the taps must not be deleted in the relation with signal processing delay. After 1025 taps are completely written, renewal may be performed by returning to the first tap.

(H). When at least ten symbols are checked in this manner, radio slot synchronization can be obtained from the chip synchronization and symbol synchronization of the present base stations including adjacent base stations and the position of the long code mask symbol. This processing is performed by the profiler, so that the logic for comparing and detecting the strongest correlation output and the time are specified.

Of course, when communication situation is deteriorated, and when judgment cannot be made only with ten symbols (corresponding to one radio slot) of data, the next ten symbols are also used for the judgment. In the profiler, the result for each sample of the same phase in one radio slot is added or processed otherwise to perform the judgment. In any case, the above-described operation processing may continuously be repeated.

The power consumption in the spread spectrum communication correlation circuit according to the embodiment of the present invention will next be described concretely with reference to [Table 2], [Table 3] and FIG. 9.

For conversion time of one time, four times, 16 times, 64 times, 256 times, 1024 times as examples a to f, the clock frequency (MHz) the number of gates of the high-speed correlator (SC), the number of gates of memory section F/F, the number of delay F/F fates, the number of multi-tap (time converting) F/F gates, and further the total number of gates of each example are shown.

TABLE 2

| | Conversion Time | MHz Clock Frequency | k Gate SC | k Gate Memory Section F/F | k Gate Delay F/F | k Gate Time Convert F/F | k Gate Total |
|---|---|---|---|---|---|---|---|
| a | | 16 | 600 | 0 | 135 | 0 | 735 |
| b | | 64 | 154 | 102 | 34 | 1 | 291 |
| c | 16 | 256 | 39 | 127 | 4 | 2 | 172 |
| d | 64 | 1024 | 10 | 133 | 1 | 8 | 152 |
| e | 256 | 4096 | 3 | 135 | 0 | 34 | 172 |
| f | 1024 | 16384 | 1 | 135 | 0 | 135 | 271 |

Moreover, the example a to f are shown with respect to the power consumption of CMOS process level (gate length) of 0.35 μm, 0.25 μm, 0.18 μm. Calculation is performed with power consumption (W)=the number of gates×frequency× unit power consumption value. The unit power consumption is represented by μW/gate/MHz, and presented by each maker. Additionally, [Table 3] also shows the power consumption of 600 k gate full MF for reference.

TABLE 3

| | Power Consumption (W) | | |
|---|---|---|---|
| | 0.35 μm | 0.25 μm | 0.18 μm |
| a | 7.06 | 0.82 | 0.41 |
| b | 8.22 | 0.96 | 0.48 |
| c | 8.15 | 0.95 | 0.48 |
| d | 13.23 | 1.54 | 0.77 |
| e | 91.72 | 10.72 | 5.35 |
| f | 1339.88 | 156.32 | 78.16 |
| Full MF | 5.76 | 0.67 | 0.34 |

Figure 9:
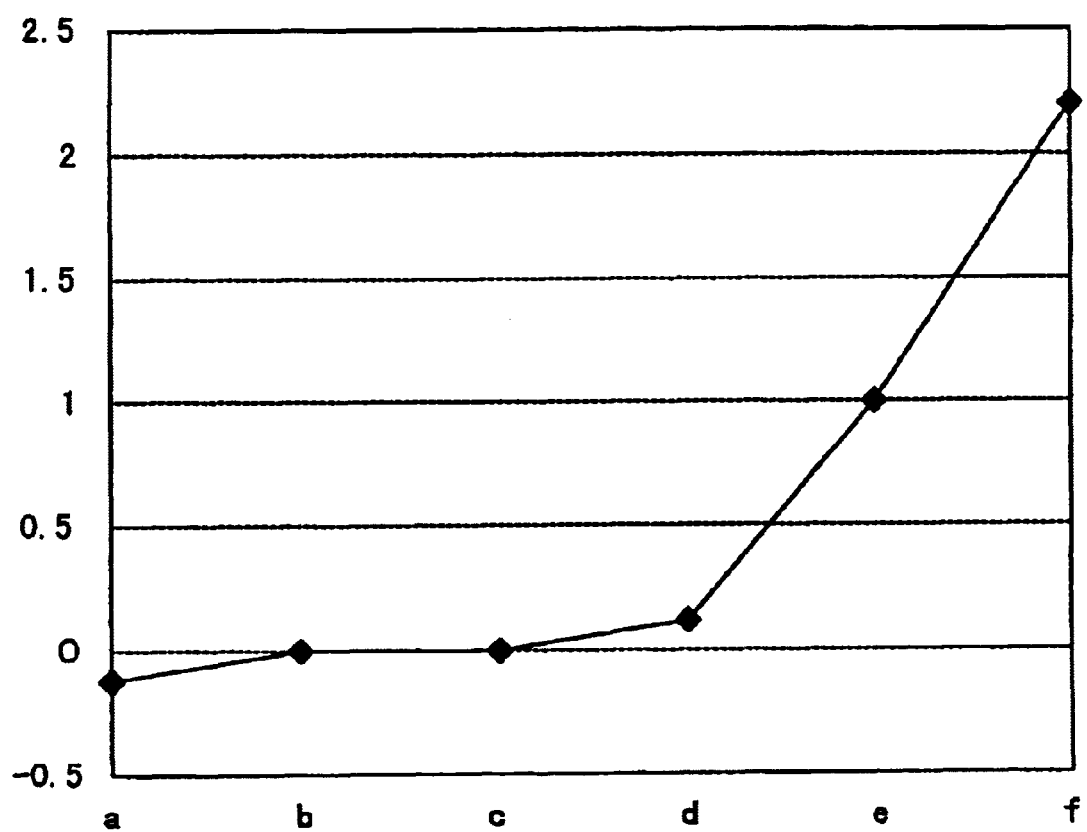
FIG. 9 is a graph showing the situation of power consumption in the present invention.

Moreover, when the power consumption for the gate length of 0.25 μm in [Table 3] is shown in Log, in the examples a to f, −0.08449, −0.01825, −0.02198, 0.188364, 2.194013 are obtained, and the change is shown in FIG. 9. FIG. 9 shows the power consumption for the gate length of 0.25 μm in Log.

In FIG. 9, it is seen that the cases a to c (conversion time 1 to 16 times) attain a low power consumption.

Next, the specifying of the long code group will be described as a second step.

When the ,radio slot synchronization can be established, the position where the long code mask symbol of the second perch is present can be known and the information is taken into the memory. Actually, since the symbol is present in the same position as that of the long code mask symbol of the first perch, the information can be obtained in the same position.

Subsequently, the information taken into the memory may be subjected, for example, to the operation. (A) to (C) during the initial synchronization. In this case, sine the symbol synchronization is established, the first sample taken in the memory section 14 is sure to be the top of the symbol. When the information read from the memory section 14 is processed by using the high-speed correlator and changing 16 types of spread codes instead of using the same spread code, the correlation can be obtained somewhere, so that the long code group can be specified.

It is extremely easy to specify the long code group within one symbol time. As described in the previous example, since 64 digits of correlation outputs can simultaneously be obtained within 64 sample time, the delay F/F 17 is not necessarily required. It is more preferable to supply the same signal to 64 high-speed correlators (SC) 16.

The specifying of the long code and the establishing of the frame synchronization will next be described as a third step.

When the radio slot synchronization can be established, the position where the pilot symbol of the first perch is present can be known, and the information is taken into the memory. In this case the information for two symbols may be taken, but if there is any free memory, all of four pilot symbols may be taken.

When the sampling of information is completed, the operation is performed in the same manner as in the second step. There are 32 types of long codes including a phase difference in total within one long code group, and 16 phases. are present because 16 radio slots are repeated. Therefore, even when one correlator is used by changing the long code, the long code can be specified in 32 (32 types)×16 (16 phases)×4 (pilots for four symbols)×4 (4 μs: time for 64, samples [16 MHz for one sample] with 256 MHz clock)÷64 (because 64 correlation outputs can simultaneously be obtained)=128 μs.

When the-usual correlator is used to specify the long code in real time, and since the pilot symbol exists only four times in ten symbols for one symbol time (64 μs)×32 (32 types)× 16 (16 phases)=32768 μs (about 33 ms), 2.5 (10/4) times, that is, 80 ms or more (about. 33 ms×2.5) is required. Therefore, as compared with the conventional correlator, when the present circuit is used, a remarkable time reduction can be realized.

A required time for each step in an ideal state is, shown as follows. As a condition, the 1 GHz clock can be used.

First step: 0.625 ms (the same as the conventional system)

Second step: 0.001 Ms (0.625 ms for one radio slot in the conventional system)

Third step: 0.22 ms (80 ms in the conventional system)

In actuality, since one radio slot is necessary for one processing, the time is represented in a radio slot unit.

First step: 1 (the same as the conventional system)

Second step: 1 (the same as the conventional system)

Third step: 1 (32×16=512 (512 radio slots×0.625 ms=320 ms) in the conventional system, and to further precisely perform the processing, four or five times are required)

In any case, the time of the third step is a main problem, and in the present circuit, the time of the third step is remarkably reduced. Therefore, even when the time of the first step is raised by one digit, the present circuit is still superior to the conventional system.

The operation during diversity hand over or diversity hand off (DHO Will next be described.

When the environment of communication with the base station being communicated (the current base station) is deteriorated (in many cases the base station being communicated is far. away and a close base station is approaching), and when better communication environment is obtained in the communication with the close base station, first the close base station is found, and the communication with the close base station is started. In this case, the same information as that from the current base station is requested to be transmitted from the close base station, and both information are received. Specifically, cell diversity reception is performed, and continued until each level of both reception signals reaches a predetermined value or more. Thereafter, the communication with the current base station is disconnected, thereby shifting to the communication state with the new adjacent base station. This is called soft hand over or soft hand off, and the communication can be realized without being discontinued. As described above, to perform the cell diversity reception and the soft hand over or the soft hand off means DHO.

In the ARIB specification, all the base stations asynchronously operate. Therefore, for the process of establishing the chip synchronization, symbol synchronization, and radio slot synchronization of the adjacent base station, the processing similar to that of the initial synchronization is necessary. Therefore, new hardware is usually added for DHO. Specifically, a separate antenna is used, and directed to the close base station, and other countermeasures are employed.

Here, a system in which hardware idle time is utilized to perform DHO will be described.

Additionally, even in the hardware construction not adapted to the DHO, as described above, a large number of memories and a large number of sliding correlators for inversely converting (demodulating) the information are installed. These numbers reach the maximum when the power switch of the mobile unit is turned on and the perch channel is captured. When the operation is completed, most of the memories and sliding correlators may be halted. When this is used during the DHO, the information from the handed over base station can be demodulated without any problem.

Figure 10:
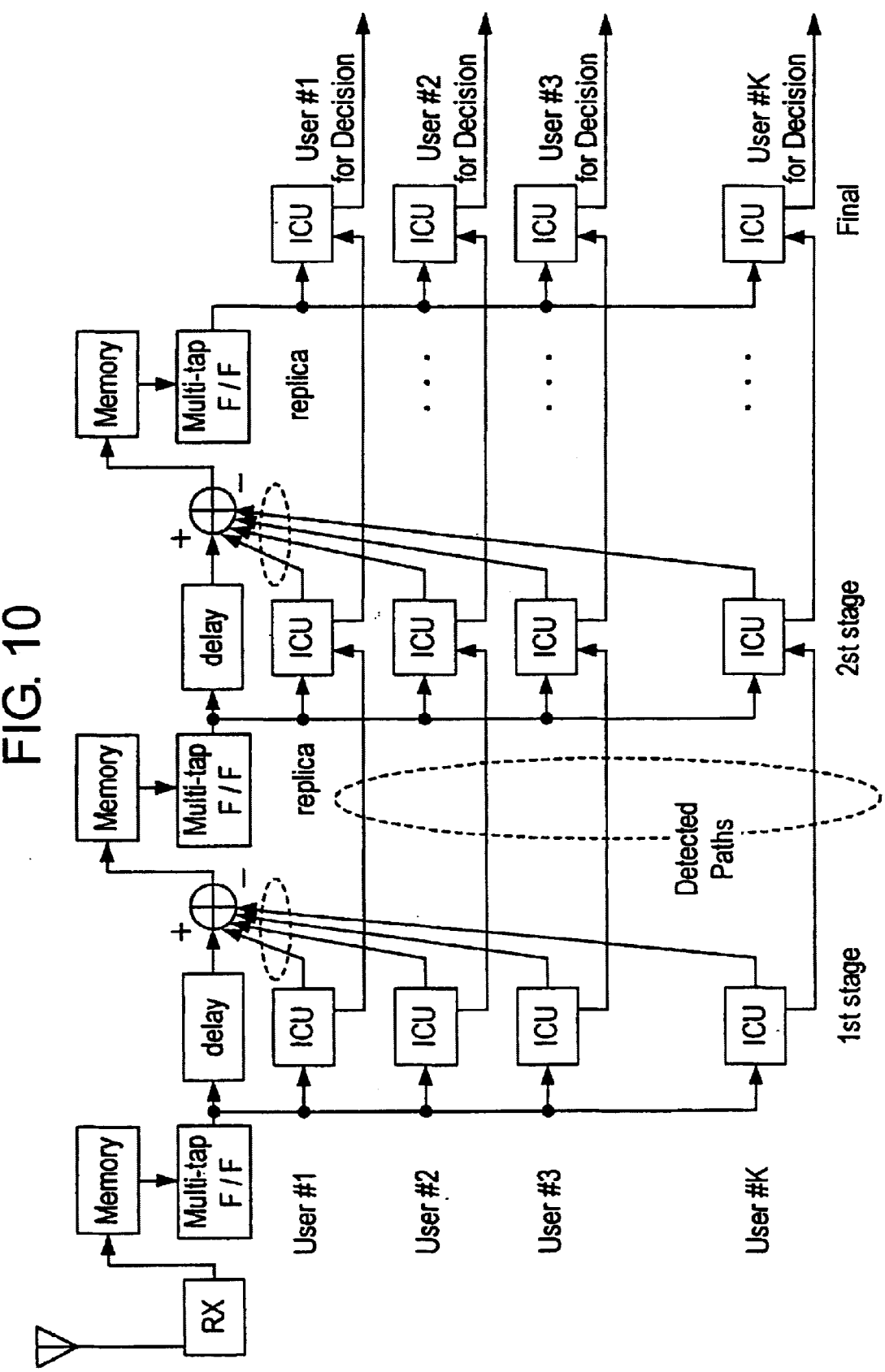
FIG. 10 is a block diagram showing the circuit used in the interference canceler.

The use of the present circuit as an interference canceler will next be described with reference to FIGS. 3 and 10. FIG. 3 is a block diagram of the correlation circuit according to the embodiment of the present invention which is used in an interference canceler unit. FIG. 10 is a block diagram of an interference canceler using the interference canceler unit according to the embodiment.

As shown by the constitution of FIG. 3, the interference canceler unit (ICU) is provided with MF, and further as shown in FIG. 10, the interference canceler is constituted of a large number of ICUs, thereby resulting in the enlargement of LSI scale and the increase of LSI number.

Specifically, the number of users×the number of stages× integral multiple of MFs are necessary, the number of users is 300 or 600, the number of stages is at least three, and the integer is at least four or eight. Therefore, 3000 to 10000 MFs are necessary.

In the embodiment, the present circuit which can perform a high-speed operation processing is implemented in the above-described MF section, and the number of MFs is remarkably reduced.

Moreover, as shown in FIG. 10, the memory sections and multi-tap F/F are disposed in the subsequent stages of the receiver (RX) and two adders. (+), and the time conversion of processing speed is performed between the receiver and a delay circuit. (Delay) or a plurality of ICUs, between the adder and the delay circuit or a plurality of ICUs, and between the adder and a plurality of ICUS.

Therefore, the matched filter (MF) shown in FIG. 3 performs a high-speed product sum operation processing as compared with the usual MF.

Additionally, the basic concept of the present patent lies in a correlator which reads the information via multiple taps and performs the time conversion with the logical circuit (F/F), and the effect is unchanged if the following concept is introduced.

(1) The high-speed reading using the high-speed correlator and the reduction of clock speed by a multilayered clock during the operation. In this case since the number of high-speed correlators is increased, the reduction of power consumption does not directly result.

(2) Variable multiple of over-sampling. In the initial state, twice over-sampling is performed, and after substantial definition, fourfold over-sampling is implemented.

(3) The constitution of the high-speed correlator and MF (product sum operator) is set to be a complex type.

Figure 13:
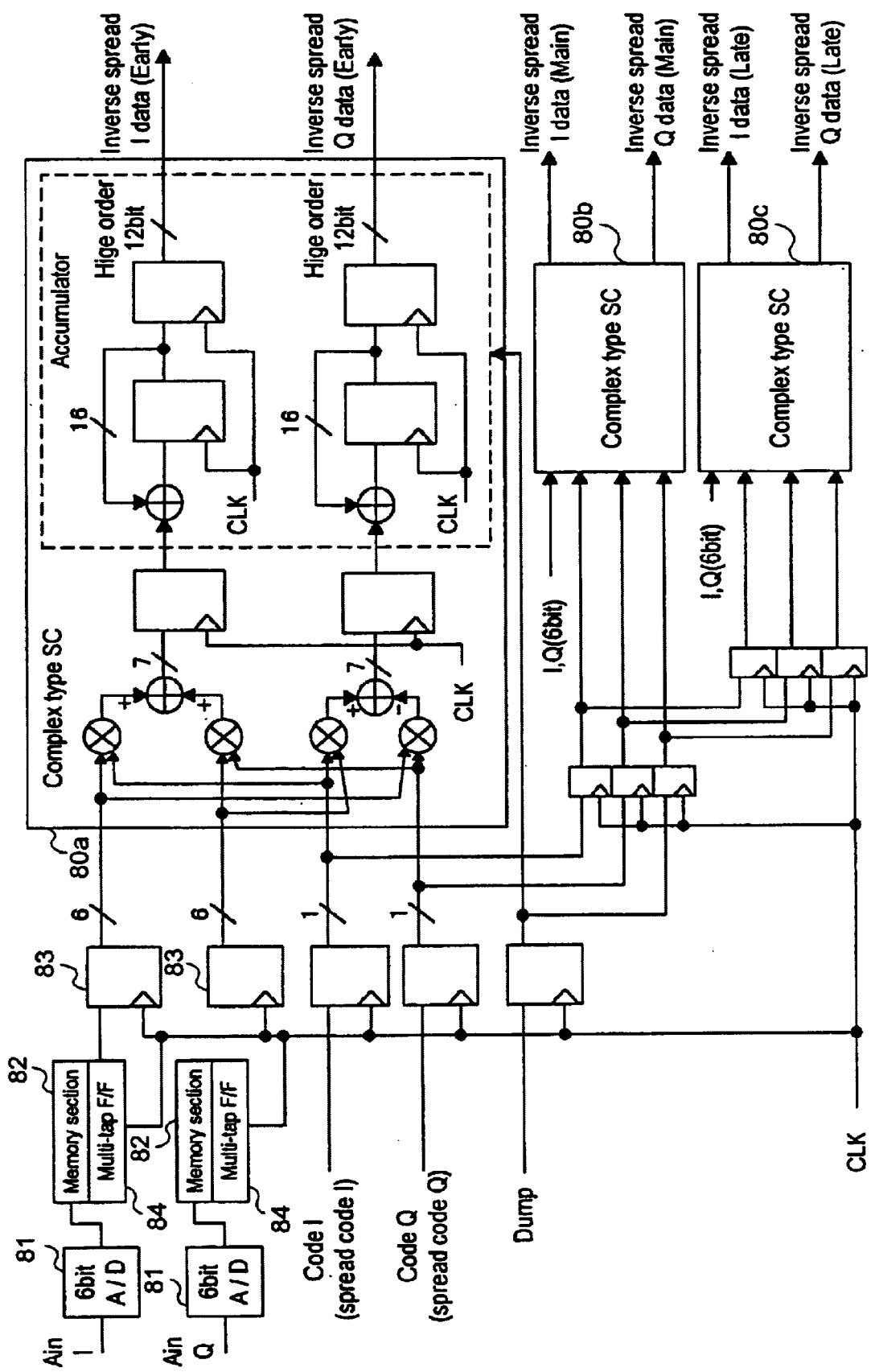
FIG. 13 is a block diagram showing the high-speed correlator of the complex type in the spread spectrum communication correlation circuit according to the embodiment of the present invention.
Figure 14:
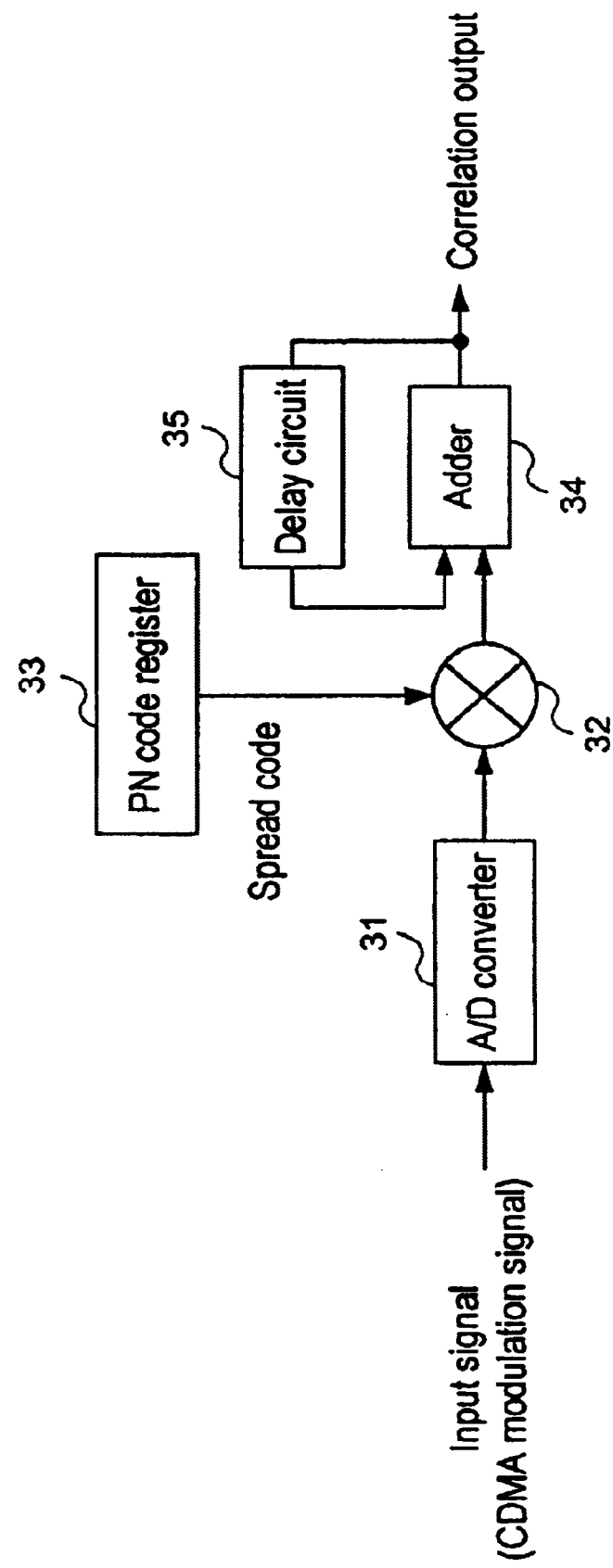
FIG. 14 is a block diagram of a part of a conventional sliding correlator.
Figure 15:
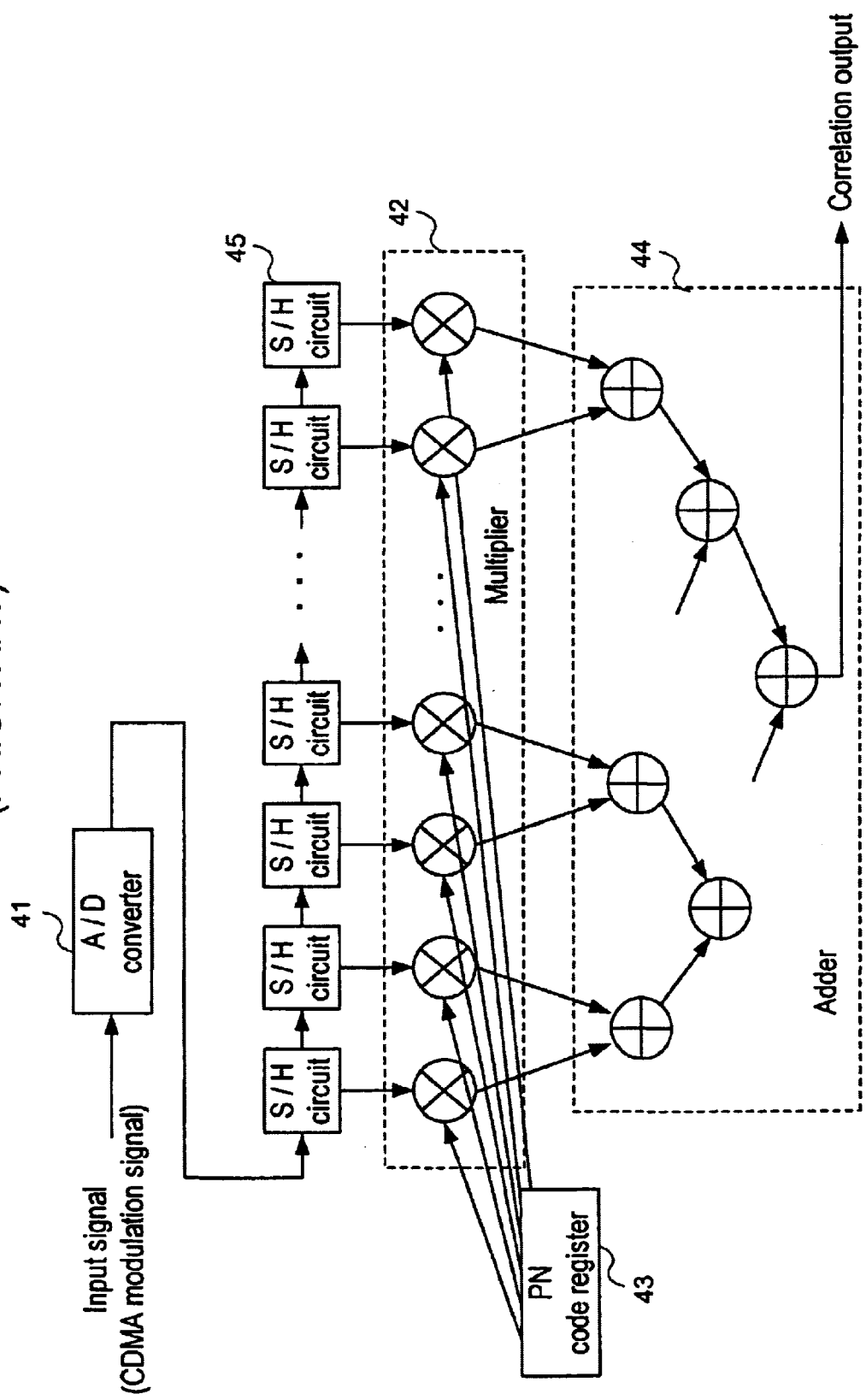
FIG. 15 is a block diagram of a conventional matched filter.

As shown in FIG. 13, the complex high-speed correlator (complex type high-speed SC) is constituted of four high-speed correlators in principle, but by designing hardware, the hardware scale becomes less than four times, and about twice the scale can constitute the hardware. Additionally, FIG. 13 is a circuit block diagram showing the high-speed correlator designed in the complex type in the spread spectrum communication circuit according to the embodiment of the present invention. However, in FIG. 13, two correlators are disposed in one complex type high-speed SC, because the addition/subtraction of I, Q signals multiplied by the spread code is performed in the previous stage of the correlator. Therefore, four correlators do not need to be used for four I, Q signals, and the signals can be processed with two correlators.

Specifically, in complex multiplication, time addition is performed as shown in the following equation:

$$(A_I+jA_Q)(C_I+jC_Q)=A_IC_I-A_QC_Q+j(A_IC_Q+A_QC_I)$$

When the type is not complex, one correlator performs AC time addition, but in the complex type, four correlators are usually used to perform the time addition of $A_IC_I$, $A_QC_Q$, $A_IC_Q$, $A_QC_I$ and subsequently perform the addition/subtraction. Logically, four correlators are necessary. In the example shown in FIG. 13, after $A_IC_I-A_QC_Q$ and $A_IC_Q+A_QC_I$ are operated, the time addition is performed, so that the hardware scale can be reduced.

Additionally, the content of FIG. 13 will be described. In the complex type constitution, 6-bit A/D converters 81 for inputting spread spectrum signals and converting analog signals to digital signals are disposed for I-phase signal and Q-phase signal, memory sections 82 for holding the digital signals outputted from the 6-bit A/D converters 81, and multi-tap F/Fs 84 for reading the data from the memory sections 82 via multiple taps (multiple samples) to perform parallel/serial conversion are disposed. Furthermore, a plurality of latch circuits 83 are disposed for adjusting the timings of data, codes and other signals to be inputted to complex type SCs 80a, 80b, 80c by clocks (CLK).

According to the spread spectrum communication correlation circuit of the embodiment of the present invention, the spread spectrum reception signal is A/D converted with the clock of 16 MHz with fourfold over-sampling, one symbol of the signals are written into the memory section and read to the multi-tap F/F via multiple taps, and one symbol of data is transmitted a plurality of times with the clock of 100 to 1000 times, that is, 1.6 GHz to 16 GHz. Additionally, while the next one symbol of data is written to the memory section, one symbol of read data is subjected to a high-speed operation processing in the high-speed correlator, so that the number of constituting elements is reduced and the correlation output can effectively be obtained.

Figure 11:
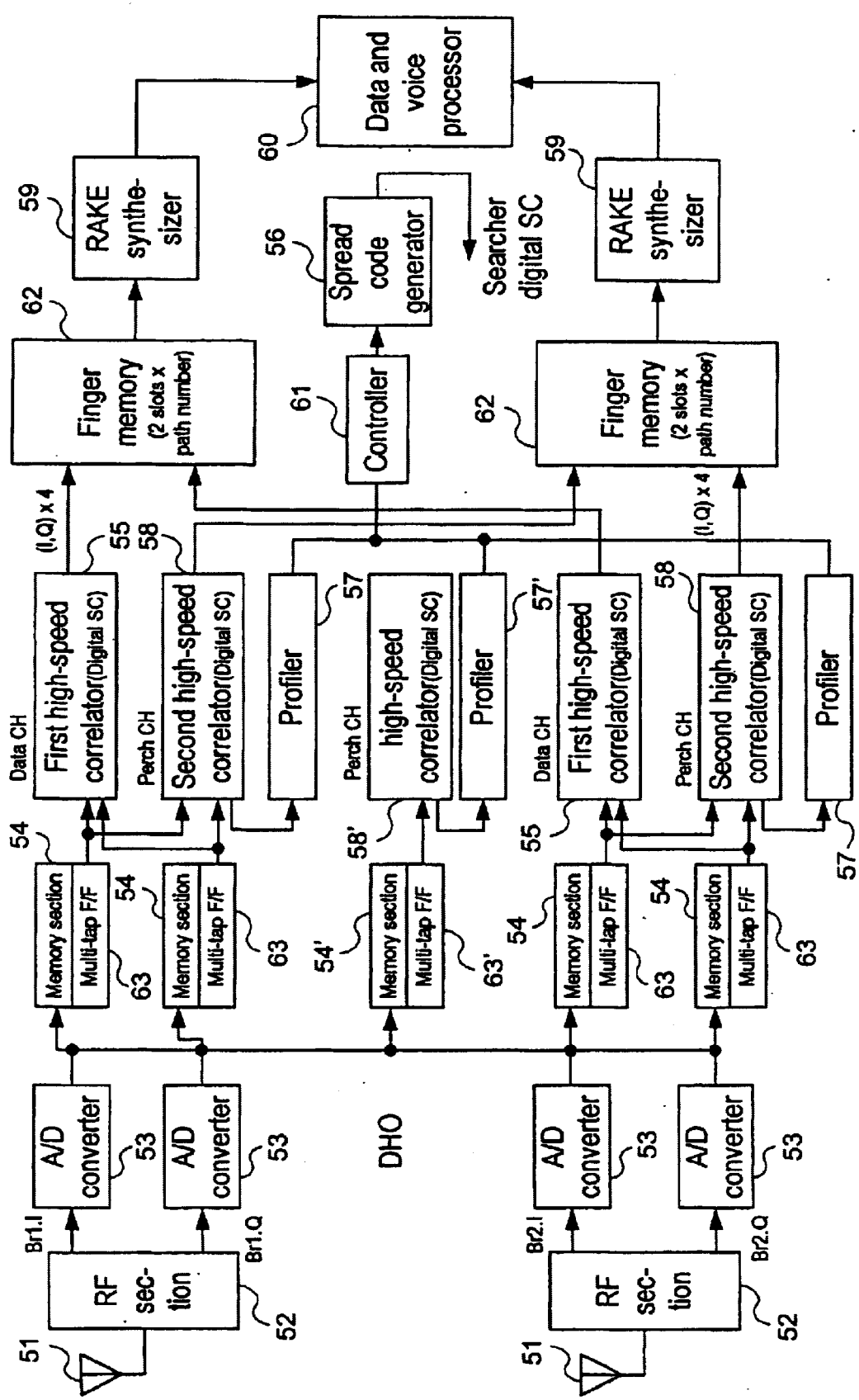
FIG. 11 is a block diagram showing a concrete example of the spread spectrum communication circuit according to the embodiment of the present invention.

The concrete and basic circuit constitution of the demodulating section using the present circuit will next be described with reference to FIG. 11. FIG. 11 is a block diagram showing the concrete example of the demodulating section of the spread spectrum communication correlation circuit according to the embodiment of the present invention.

As shown in FIG. 11, the demodulating section of the embodiment is basically constituted of an antenna 51, an RF section 52, an A/D converter 53, a memory section 54, a multi-tap F/F 63, a first high-speed correlator 55, a spread code generator 56, a profiler 57, a second high-speed correlator 5,8, a RAKE synthesizer 59, a data and voice processor 60, a controller 61, and a finger memory 62.

Each component of the demodulating section shown in FIG. 11 will next be described concretely.

Two antennas 51 are usually prepared to perform the diversity reception. The diversity reception comprises receiving the same transmission signal with two antennas, and synthesizing a demodulated result to enhance a reception sensitivity.

The radio frequency (RF) section 52 generates (demodulates) a base band (BB) signal, and performs orthogonal wave detection to separate I component (in-phase component) and Q component (orthogonal component).

The A/D converter 53 converts the BB analog signal from the RF section 52 to the digital signal. The necessary number of conversion bits is four to six bits. The conversion frequency is 16 MHz with the fourfold over-sampling in the wide band CDMA (W-CDMA). One A/D converter is necessary for the I/Q signal and each antenna, but when a high-speed processing can be performed, by executing a time-division processing, one A/D converter is sufficient.

The memory section 54 holds at least one symbol of digital signals converted by the A/D converter 53. The writing speed is about one to four times the chip speed, and the reading speed may be the same, but the reading is performed via multiple taps.

The multi-tap F/F 63 converts the parallel data inputted via the multiple taps from the memory 54 to serial data and outputs the serial data to the subsequent high-speed correlator. Here, the time conversion is performed.

Additionally, when the matched filter (MF) is used instead of the high-speed correlator, collective reading in the symbol unit is required.

Moreover, there is provided a memory section 54' for DHO.

The first high-speed correlator (digital SC) 55 takes the spread spectrum signal held by the memory section 54 and the spread code from the spread code generator 56, and performs-its product sum operation for one symbol unit. As compared with the chip rate, a high-speed operation is performed.

Moreover, the second high-speed correlator (digital SC) 58 performs the operation similar to that of the first high-speed correlator 55, but the operation result of the second high-speed correlator is transmitted to the profiler 57.

Additionally, the matched filter (MF) may be used instead of the second high-speed correlator 58.

Moreover, there is provided a high-speed correlator 58' for DHO.

The spread code generator 56 transmits the designated spread code with the designated phase according to the instruction from the controller 61. Additionally, the register for storing the spread code may be used instead of the spread code generator.

In the spread code generator with a usual speed, in the same manner as in the processing of CDMA modulation signal, the code may be taken into the memory section and subjected to the time conversion by the multi-tap F/F. Alternatively, the code may directly be taken into the multi-tap F/F and subjected to a high-speed time conversion processing. Since the number of bits is small, and the same code is repeatedly used in many cases, it is more preferable to directly take the code into the multi-tap F/F.

The profiler 57 takes and operates the output from the second high-speed correlator 58 (or MF), and specifies the path. Thereby, in the stage of initial synchronization, the chip synchronization, symbol synchronization, radio slot synchronization, and frame synchronization can be taken, and the base station can be specified.

Furthermore, in the communication state in which the base station to be connected is determined, the path is detected. These information are transmitted to the controller 61, and the controller 61 transmits its instruction to the first high-speed correlator 55, the memory section 54 and the spread code generator 56.

Moreover, there is provided a profiler 57' for DHO, and during DHO, the adjacent base station and the path are specified.

The MF used instead of the second high-speed correlator 58 takes the spread spectrum signal and the spread code, and performs its product sum operation in one symbol unit. As compared with the chip rate, a high-speed operation is performed. By performing the high-speed operation, the information from a plurality of memories can be processed at an extremely high speed, so that the application to the interference canceler can be realized.

The RAE synthesizer 59 performs the phase correction using the pilot symbol on the correlation output taken by the finger memory 62 from the first high-speed correlator 55, and subsequently performs the synthesis of complex path (RAKE synthesis).

Moreover, the RAKE synthesizer 59 additionally includes AFC for adjusting the reception signal and frequency, SIR measuring section for measuring the current proportion of the reception signal and noise (including the interference from other signals), and the like.

The data and voice processor 60 performs the inverse conversion (demodulation) of various signal processings performed to correct errors on the transmission side. In this there are deinterleave, Viterbi decoding, CRC decoder, Reed-Solomon code (or turbo decoding), voice CODEC, and the like.

As described above in detail, according to the spread spectrum communication correlation circuit of the embodiment of the present invention, the CDMA demodulation circuit can be constituted with a small gate scale, and there is an effect that in near future the mobile terminal LSI which can obtain correlation with a small scale can be developed.

According to the present invention, the spread spectrum communication correlation circuit is provided with the memory section which can simultaneously perform the writing and reading of the received spread spectrum signal, and performs a high-speed product sum operation in the high-speed correlator by the logical section (time converting F/F: multi-tap F/F) for taking the signal from the memory section to perform a high-speed time conversion and a plurality of delay F/Fs, so that the scale of the constituting elements is reduced and the correlation can effectively be obtained.

What is claimed is:

1. A correlation circuit for spread spectrum communication which repeats a process a plurality of times, the correlation circuit comprising:

means for writing at a first speed a spread spectrum reception signal into a memory the spectrum spread reception signal received by a receiving section, means for reading the written spread spectrum signal from said memory at a second speed, the second speed being higher than the first speed and means for performing product sum operation with a spread code at a third speed.

2. A correlator for spread spectrum communication comprising:

two correlation circuits for spread spectrum communication according to claim 1, wherein the receiving section in each of said correlators are used in common, so that an in-phase component (I) and an orthogonal component (Q) of an orthogonal wave detecting signal of a spread spectrum signal are wave-detected by said receiving section, are multiplied by different spread codes, and the multiplication results are added.

3. A correlator for spread spectrum communication comprising four correlation circuits for spread spectrum communication according to claim 1, wherein two sets of correlation circuits are used as a pair, the receiving section in the pair of correlators is used in common, so that an in-phase component (I) and an orthogonal component (Q) of an orthogonal wave detecting signal of a spread spectrum signal are wave-detected by said receiving section, are multiplied by different first and second spread codes, and for four correlation outputs obtained by adding multiplication results, the results of operation with said first spread code and the results of operation with said second spread code are added and synthesized.

4. A correlation circuit for spread spectrum communication which repeats a process a plurality of times, the correlation circuit comprising:

one or more receiving sections for receiving spread spectrum signals;

one or more memory sections for holding said received spread spectrum signals;

a controller for controlling writing into the memory sections and reading from the memory sections;

one or more multiplying sections for multiplying the signals held in said memory sections and spread codes; and one or more adding sections for adding said multiplication results, wherein the spread spectrum signal inputted from said one or more receiving sections is time-divided in a sampling time or a time-shorter than the sampling time, at least one symbol of time-divided signals are written and held in said memory sections, the held signals are read in a time which is shorter than the time-shorter than said sampling time, the signal is multiplied by the spread code in said multiplying sections, and the multiplication results are added by said adding sections to obtain correlation.

5. The correlation circuit for spread spectrum communication according to claim 4 wherein each memory section comprises a two-port memory which can be simultaneously written into and read from with different time widths.

6. The correlation circuit for spread spectrum communication according to claim 4 wherein each multiplying section comprises a multiplier for multiplying the spread code of one bit and the spread spectrum signal of multiple bits, and operating according to a logic in which when the spread code is "1", the multiple bits are outputted as they are, and when the spread code is "0", of the multiple bits are outputted in reverse.

7. The correlation circuit for spread spectrum communication according to claim 4 wherein each adding section comprises:
an accumulation adder having an adder of multiple bits, and
a delay element for receiving an output as an input from said adder, for delaying the input by one unit time, and for returning the input to said adder.

8. A correlation circuit for spread spectrum communication according to claim 5 wherein the memory sections each comprise a two-port memory which can be simultaneously written into and read from with different time widths, and which can read one symbol at once via multiple taps and multiple bits.

9. The correlator circuit for spread spectrum communication according to claim 8 wherein the multiplying section comprises a multiplier for multiplying the spread code of one bit and the spread spectrum signal of multiple bits for multiple taps, and operating according to a logic under which, when the spread code is "1", the multiple bits are outputted as they are, and when the spread code is "1", the multiple bits are outputted in reverse.

10. The correlator circuit for spread spectrum communication according to claim 9 wherein the adding section comprises a plurality of adders of multiple bits for adding multiplication results of the multiple taps obtained by the multiplying section.

11. A correlation circuit for spread spectrum communication comprising:
an A/D converter for converting a spread spectrum analog reception signal to a digital signal;
a plurality of sample-and-hold circuits for time-dividing, writing and holding at least one symbol of converted digital signals in a sampling time or a time shorter than the sampling time, and successively reading said signals for each time-divided and held sample at a speed higher than a speed of writing that takes place in the plurality of sample-and-hold circuits;
a code generator for generating a spread code;
a high-speed correlator for successively inputting one symbol of signals from said sample-and-hold circuits for each sample at a high speed, and performing a high-speed product sum operation with the spread code inputted from said code generator; and
a controller for allowing said plurality of sample-and-hold circuits to write one symbol or more of signals, allowing said high-speed correlator to start reading the signals from said sample-and-hold circuits for each sample at a speed higher than the writing speed, and allowing said plurality of sample-and-hold circuits to start writing the next one symbol or more of signals.

12. A correlation circuit for spread spectrum communication comprising:
an A/D converter for converting a spread spectrum analog reception signal to a digital signal;
a two-port memory for time-dividing, writing and holding at least one symbol of converted digital signals in a sampling time or a time shorter than the sampling time, and successively reading said signals for each time-divided and held sample at a speed higher than a speed of the writing in the two-port memory;
a code generator for generating a spread code;
a high-speed correlator for successively inputting one symbol of signals from said two-port memory for each sample at a high speed, and performing a high-speed product sum operation with the spread code inputted from said code generator; and
a controller for allowing said two-port memory to write one symbol or more of signals, allowing said high-speed correlator to start reading the signals from said two-port memory for each sample at a speed higher than the writing speeds and allowing two-port memory to writing the next one symbol or more of signals, wherein said two-port memory comprises
a plurality of memory cells for holding the spread spectrum signals,
a first address decoder for writing the signals from said A/D converter to the corresponding memory cell according to an instruction from said controller,
a second address decoder for reading the signals from the corresponding memory cell at a speed higher than the writing speed according to the instruction from said controller, and
a sense amplifier for amplifying the output from said second address decoder.

13. An interference canceler comprising:
a plurality of interference canceler units having matched filters for an in-phase component (I) and an orthogonal component (Q) of an orthogonal wave detecting signal of a received spread spectrum signal, wherein a memory is disposed in the previous stage of said matched filter, which performs writing at a first speed and reading at a second speed and which can perform writing and reading at the same time with the second speed being higher that the first speed, and said matched filter performs a high-speed operation processing on the signal read from said memory at a high speed.

14. A correlation circuit for spread spectrum communication which repeats a process a plurality of times, the correlation circuit comprising:
means for writing at a first speed a spectrum spread reception signal into a memory, the spectrum spread reception signal received by a receiving section;
means for storing the written signal to a logical section for reading the signal from said memory via multiple taps in accordance with a time conversion amount to perform a time conversion,
means for operating said logical section at a speed higher than the first writing speed of said memory to perform a parallel/serial conversion and time conversion, and performing a product sum operation with a spread code at a high speed.

15. A correlator for spread spectrum communication comprising: two of correlation circuits for spread spectrum communication according to claim 14, wherein the receiving section in each of said correlation circuits is used in common, so that an in-phase component (I) and an orthogonal component (Q) of an orthogonal wave detecting signal of a spread spectrum signal are wave-detected by said receiving sections, are multiplied by different spread codes, and the multiplication results are added.

16. A correlator for spread spectrum communication comprising:
four of correlation circuits for spread spectrum communication according to claim 14, wherein two sets are regarded as a pair, the receiving section in the pair of correlators is used in common, so that an in-phase component (I) and an orthogonal component (Q) of an orthogonal wave detecting signal of a spread spectrum signal are wave-detected by said receiving sections are multiplied by different first and second spread codes in each pair, and, for four correlation outputs obtained by adding multiplication results, the results of operation with said first spread code and the results of operation with said second spread code are added and synthesized.

17. A correlator for spread spectrum communication comprising:
one or more receiving sections for receiving spread spectrum signals;
one or more memory sections for holding said received spread spectrum signals, a logical section for performing time conversion to perform a high-speed operation processing on the signal read from said memory;
one or more multiplying sections for multiplying the signal held in said memory section and a spread code; and
one or more adding sections for adding said multiplication results, wherein the spread spectrum signal inputted from said one or more receiving sections is time-divided in a sampling time or a time shorter than the sampling time, about one symbol of time-divided signals are held in said memory section, the signals held in said memory section are read via multiple taps in accordance with a time conversion amount in said logical section to perform a high-speed parallel/serial conversion and time conversion, the signal is multiplied by the spread code in said multiplying section, and the multiplication results are added by said adding section to obtain correlation.

18. The correlator for spread spectrum communication according to claim 17 wherein the memory section comprises a two-part memory which can simultaneously perform the writing and the reading.

19. The correlator for spread spectrum communication according to claim 17 wherein the multiplying section comprises a multiplier for multiplying the spread code of one bit and the spread spectrum signal of multiple bits, and operating according to a logic in which when the spread code is "1", the multiple bits are outputted as they are, and when the spread code is "0", reverse of the multiple bits is outputted.

20. The correlator for spread spectrum communication according to claim 18 wherein the multiplying section comprises a multiplier for multiplying the spread code of one bit and the spread spectrum signal of multiple bits, and operating according to a logic in which when the spread is code is "1", the multiple bits are outputted as they are, and when the spread code is "0", reverse of the multiple bits is outputted.

21. The correlator for spread spectrum communication according to claim 17 wherein the adding section comprises an accumulation adder having an adder of multiple bits, and a delay element for receiving an output as an input from said adder, delaying the input by one unit time, and returning the input to said adder.

22. The correlator for spread spectrum communication according to claim 17 comprising: a plurality of delay sections for successively delaying the output from the logical section and holding and outputting the output for each specified plurality of bits, wherein
the multiplying section comprises a multiplier for multiplying the specified plurality of bits inputted from said plurality of delaying sections and the spread code of one bit, and operating according to a logic in which when the spread code is "1", the multiple bits are outputted as they are, and when the spread code is "0", reverse of the multiple bits is outputted, and
the adding section comprises a plurality of adders of multiple bits for adding multiplication results obtained by said multiplying sections.

23. A correlation circuit for spread spectrum communication comprising: a first A/D converter for performing an analog/digital conversion of an orthogonal component (Q) in an orthogonal wave detecting signal of a received spread spectrum signal; a second A/D converter for performing the analog/digital conversion of an in-phase component (I) in the orthogonal wave detecting signal of the received spread spectrum signal; a memory section for storing the signals from said first and second A/D converters; first and second time converting logical sections for alternately performing an operation of reading stored data via multiple taps from said memory section in accordance with a time conversion amount, performing a parallel/serial conversion and outputting; a plurality of delaying sections for successively delaying the data outputted from said first and second time converting logical sections; and a plurality of high-speed correlators for calculating correlation of the outputs from said first and second time converting logical sections and the outputs from said plurality of delaying sections at a high speed.

* * * * *